United States Patent
Lord

(10) Patent No.: US 6,827,786 B2
(45) Date of Patent: Dec. 7, 2004

(54) MACHINE FOR PRODUCTION OF GRANULAR SILICON

(76) Inventor: Stephen M Lord, 109 Peppertree La., Encinitas, CA (US) 92024

( * ) Notice: Subject to any disclaimer, the term of this patent is extended or adjusted under 35 U.S.C. 154(b) by 505 days.

(21) Appl. No.: 09/749,988

(22) Filed: Dec. 26, 2000

(65) Prior Publication Data
US 2002/0081250 A1 Jun. 27, 2002

(51) Int. Cl.$^7$ ............................................. C23C 16/00
(52) U.S. Cl. ...................... 118/716; 422/110; 422/129; 422/139; 422/145; 422/146; 422/147; 422/194; 422/198
(58) Field of Search .......................... 118/716; 422/110, 422/129, 139, 145–147, 190, 194, 198

(56) References Cited

U.S. PATENT DOCUMENTS

| | | |
|---|---|---|
| 3,012,861 A | 12/1961 | Ling |
| 4,092,446 A | 5/1978 | Padovani |
| 4,207,360 A | 6/1980 | Padovani |
| 4,416,913 A | 11/1983 | Ingle |
| 4,424,199 A | 1/1984 | Iya |
| 4,784,840 A | 11/1988 | Gautreaux et al. |
| 4,818,495 A | 4/1989 | Iya |
| 4,900,411 A | 2/1990 | Poong et al. |
| 4,992,245 A | 2/1991 | Van Slooten |
| 5,037,503 A | 8/1991 | Kajimoto |
| 5,242,671 A | 9/1993 | Allen |
| 5,374,413 A | 12/1994 | Kim |
| 5,798,137 A | 8/1998 | Lord |
| 5,810,934 A | 9/1998 | Lord |
| 2004/0000697 A1 * | 1/2004 | Setoguchi et al. .......... 257/432 |

OTHER PUBLICATIONS

Beers, A. M. CVD Silicon Structures Formed by Amorphous and Crystalline Growth.Journal of Crystal Growth vol. 64 1983, pp. 563 571.

* cited by examiner

Primary Examiner—Jeffrie R. Lund

(57) ABSTRACT

A fluidized bed reactor with one or more stages each stage having a heating section located below a reacting section and a mechanism that pulses granules back and forth between the heating and reacting sections, separate injectors for silicon containing gases non silicon containing gases, heaters to heat the non silicon containing gases above the reaction temperature and the silicon containing gases to a temperature just below their decomposition temperature. The heater for the silicon containing gases controls the condensing vapor of a heat transfer fluid to a temperature below the decomposition temperature of the silicon containing gases. An enclosed noncontaminating sieving device selectively removes product and recycles undersize material. A weigh cell with frequency analysis capability provides information on the weight of the reactor and the force exerted by the pulsing action of the granules.

19 Claims, 10 Drawing Sheets

Section View A-A

Plan View

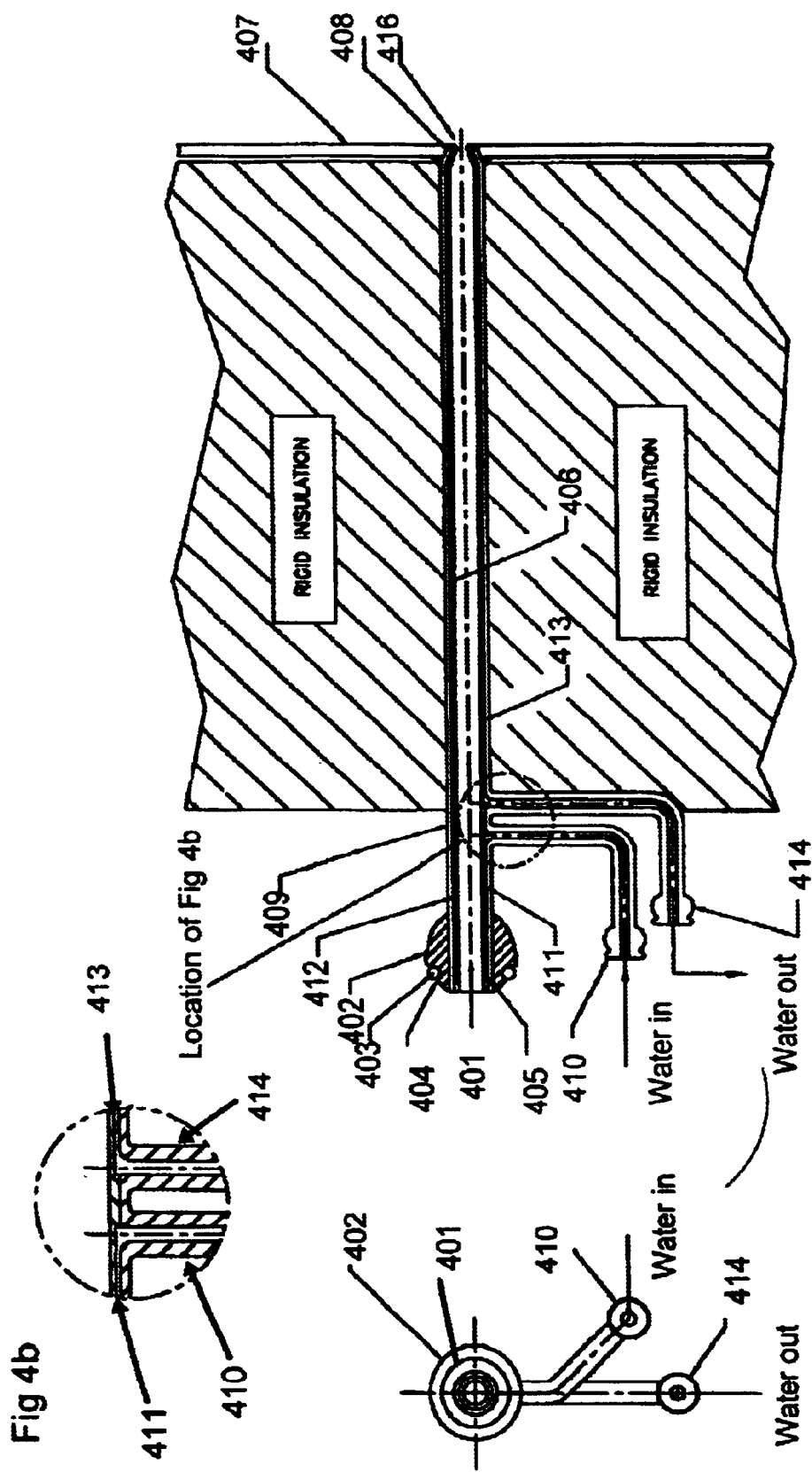

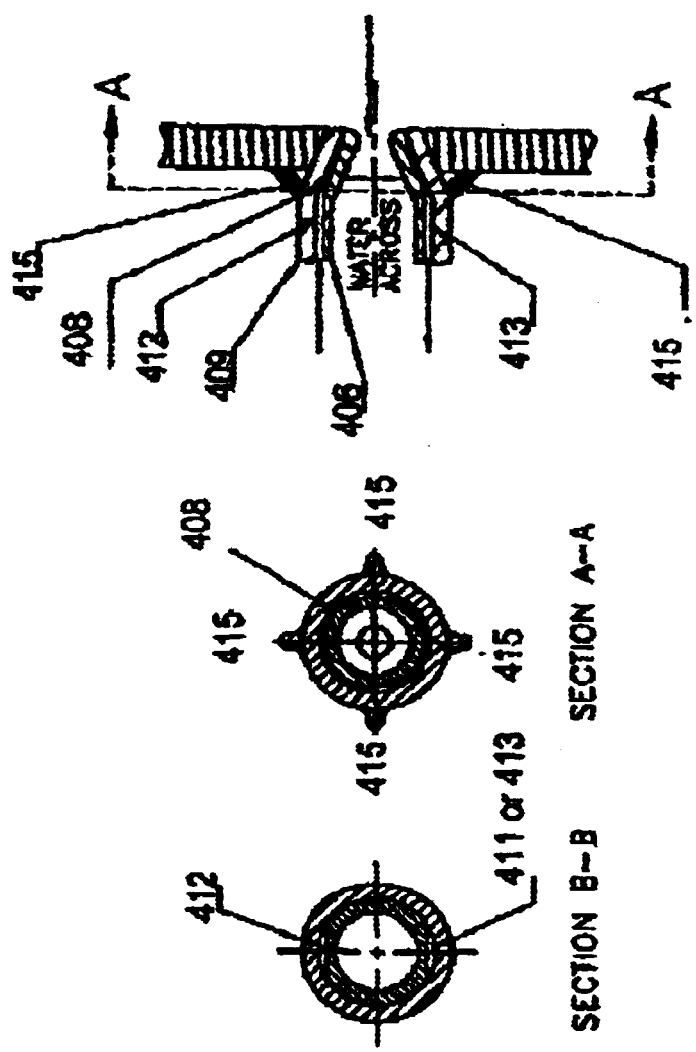

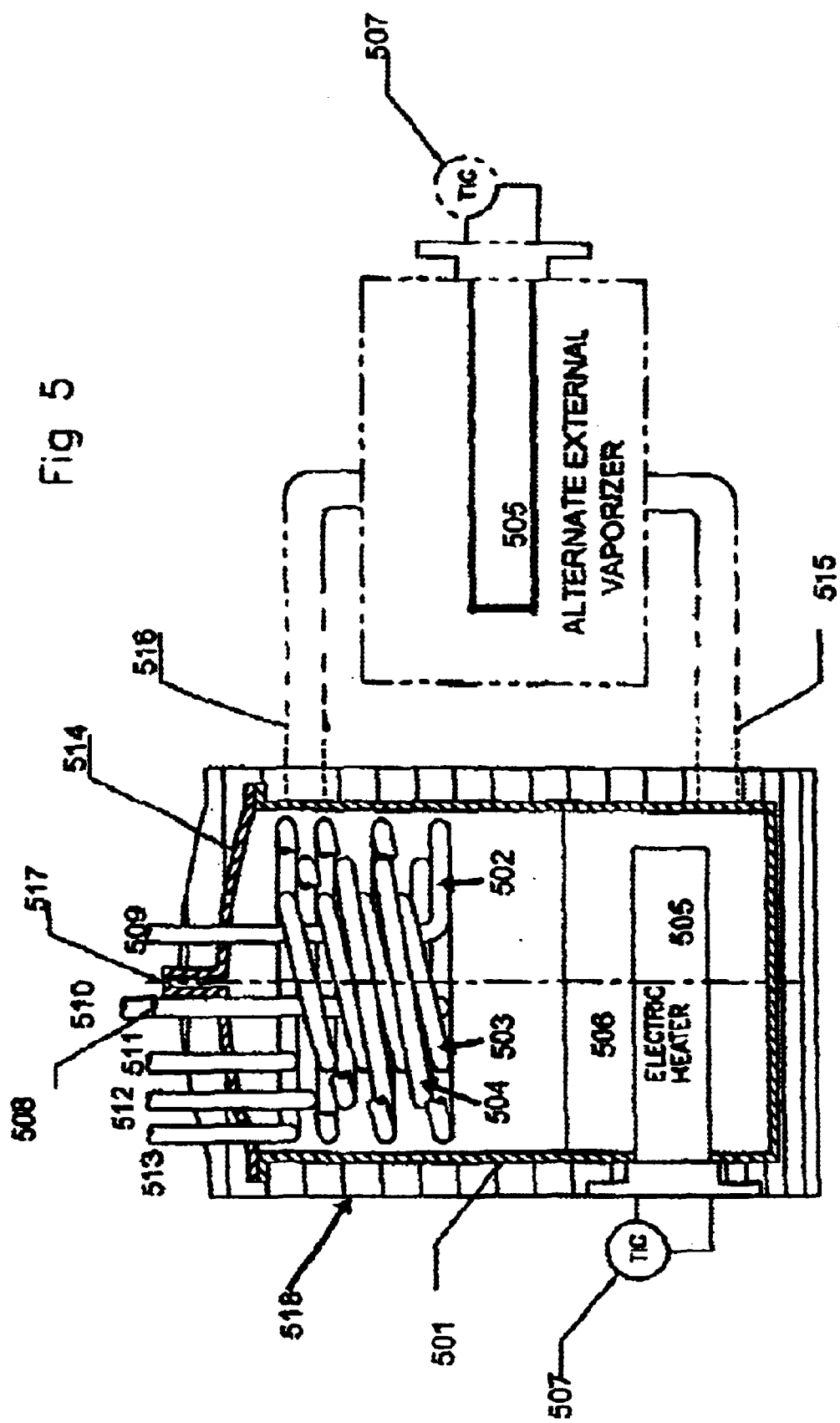

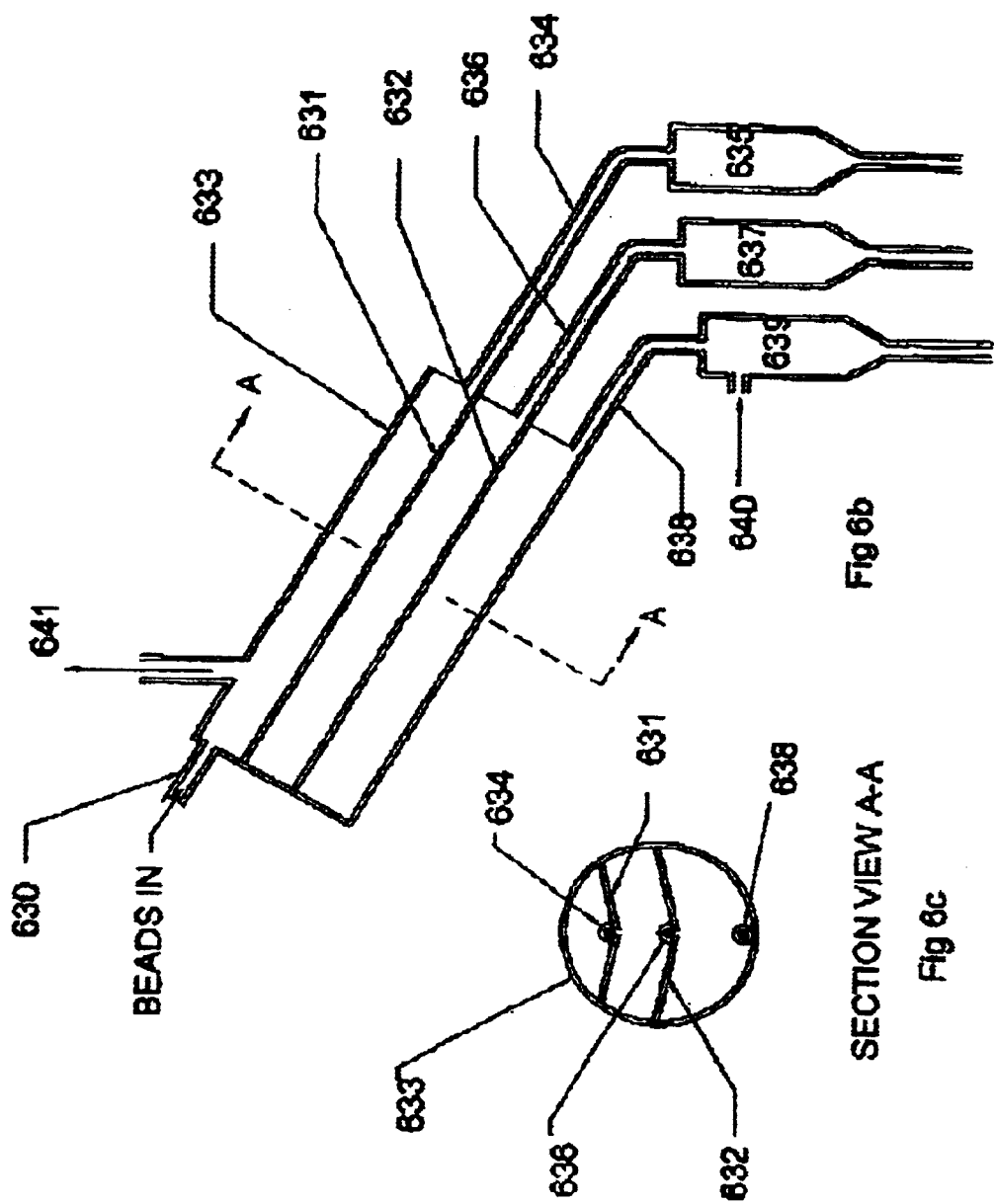

MACHINE FOR PRODUCTION OF GRANULAR SILICON

BACKGROUND OF THE INVENTION

This invention relates generally to the field of deposition of silicon by chemical vapor deposition, and more particularly to a Machine for Production of Granular Silicon which is of lower cost, more convenient, more reliable, more efficient, provides better quality granules and is better integrated into the overall silicon purification process than existing methods. The use of a pulsing gas flow to circulate granules between a heater and reactor section solves both the granule heating problem and the granule sintering problems that have prevented prior methods from operating for extended time and producing good quality granules. This approach enables use of cheap and reliable resistance heating in contrast to more expensive and less reliable techniques such as microwave and laser heating. Use of an inline non contaminating sieve technique and pulsing gas flow removes silicon product with a more uniform size and returns undersize material which reduces seed generation problems. Online adjustment of the gas pulse shape and flow distribution provides additional control of attrition and seed generation. An optional feedstock recovery system for hydrohalosilane feedstock allows a more efficient method of recycling the silicon tetrahalide by product, allows use of cheaper methods for the production of the hydrohalosilane and provides flexibility in balancing the overall product slate of a silicon purification facility.

This invention relates generally to the field of silicon purification, and more particularly to a machine for production of high purity silicon granules by the decomposition of a high purity silicon containing gas, such as silane, trichlorosilane or tribronosilane, which can be designed to optimize the overall efficiency of such a silicon purification process.

The production of high purity electronic grade silicon is the critical first step of the entire multi-billion dollar semiconductor industry. The basic process, used by most manufacturers consists of three steps; conversion of metallurgical grade silicon into a hydrohalosilane such as trichlorosilane, purification of this material by distillation and other means, and decomposition of the material back to silicon. The Ethyl process, directly reduces silicon tetrafluoride to silane with a byproduct of aluminum trifluoride.

The decomposition reactors are all rod reactors except for fluid bed reactors operated on silane as part of the Ethyl Process. Fluid bed reactor have significant capital, operating and energy advantages but have proved difficult to implement. The only operating fluid bed units produce a dusty product contaminated with hydrogen that is not widely accepted.

There are two decomposition reactions for hydrohalosilanes; thermal decomposition and hydrogen reduction. (Trichlorosilane is used in the examples but bromine or iodine can be substituted for chlorine, fluorine cannot)

$4SiHCl_3 \rightarrow Si+3SiCl_4+2H_2$ (thermal)

$SiHCl_3+2H_2 \rightarrow Si+3HCl$ (hydrogen reduction)

All halosilane reactors incorporate both and consequently produce an effluent, which has a range of silicon hydrohalides and tetrahalides and hydrogen halides and hydrogen.

The essence of the process is impure silicon in, pure silicon out plus small impurity streams. To accomplish this there are large recycle streams of hydrogen, silicon and halide containing streams and is important not to produce low value by-products or waste streams. Union Carbide developed an approach of producing silane by disproportionation then decomposing the silane $4SiHCl_3 \rightarrow SiH4+3SiCl4$ $SiH4 \rightarrow Si+2H2$ it can be seen that the overall reaction is the same as the thermal decomposition reaction.

The major use for the polycrystalline silicon is in production of single crystal silicon via melting and growth of single crystal silicon boules in Czochralski crystal pullers. Such pullers have specific requirements with regard to feeding the granules (also known as beads), contamination, and ease of melting etc. which must be met in order to use silicon beds. Kajimolo et al documents some of these issues in U.S. Pat. No. 5,037,503.

The purity requirements for electronic grade silicon are severe with specifications for hydrogen at about 30–50 ppma, parts per million atomic, oxygen at 0.5–1.5 ppma and carbon at 0.1–0.25 ppma with specifications for donors such as boron, phosphorus and aluminum in the ppba, parts per billion atomic, and metals in the ppta. parts per trillion atomic. Thus all materials which come in contact with the silicon must be virtually free of metals and donors and have very small amounts of oxygen, hydrogen and carbon which are transferable to the silicon. Historically such specifications have progressively tightened and this trend can be expected to continue. Other trends in the industry are to larger and larger wafer diameters with the current transition from 200 mm to 300 mm wafers being underway. This trend has led to the need to pull larger and larger diameter crystals which in turn leads to the desire to add silicon to the crystal growing furnace white the crystal is being pulled. This can be done conveniently with silicon granules which melt easily and are very pure and hence there is a need for such high purity granules. A further historical trend is the decreasing availability of cheap hydro-electric power which has been the prime source of energy for the very inefficient rod reacts which leads to the increasing need to improve energy efficiency in the deposition process.

Because of the lower energy, capital cost and operating cost of fluid bed reactors much work has been done to develop this technology but the problem of meeting the above ever tighter purity specifications is more acute with the use of fluid bed reactors because they are more susceptible to materials problems as the silicon product is in physical contact with the wall, which thus must be at or close to the deposition temperature. This requires hot walls in contrast to the rod reactors, which typically have cooled walls. Furthermore fluid bed reactors do not have the internal heat generation provided by the electrical healing of the rod in rod reactors and so must add heat in some other way. If this heat is added through the walls, the walls must be hotter than the silicon product. A further problem is that the materials coming into the reactor can only be preheated to a temperature below their thermal decomposition temperature which is 350–450° C. for most feedstock materials. For high tout fluid bed reactors putting in the additional heat to bring the temperature up to the desired decomposition temperature of greater than 800° C. is very difficult. The major operational problem is sintering of the beads in the reactor and the resultant plugging of the reactor, the major purity problems are metals, carbon, oxygen and hydrogen in the bulk and surface of the product and the major problem in feeding beads to the crystal puller is difficulty in controlling the bead flow due to variation in shape and size.

The sintering appears to be more prevalent as the temperature, deposition rate, silicon containing gas concentration and bead size increases and less prevalent as the fluidizing gas flow rate increases. Hence a violently fluidized bed will have a lower tendency to sinter but may tend to blow over more dust and will require more heat.

It has been accepted that it is important to have a reactor that does not contaminate the product and that the use of metal reactors is not feasible, see Ling U.S. Pat. No. 3,012,661 and Ingle U.S. Pat. No. 4,416,913 and hence metal contamination can be resolved by not contacting the beads with any metal parts. Similarly contact with carbon or carbon containing materials leads to carbon contamination so graphite or silicon carbide parts are usually coated with silicon, carbon can also come in through contaminants in the inlet gases such as carbon monoxide, carbon dioxide and methane. Oxygen normally comes in through oxygen containing compounds such as water, carbon monoxide and carbon dioxide in the inlet gases and hence all carbon and oxygen containing compounds are removed from the gas streams to as great a degree as is practicable. Oxygen containing materials such as silicon oxide (quartz) are frequently used as containment materials, see Ingle above, and can be used in contact with silicon although care must be taken to prevent erosion. Hydrogen contamination is primarily caused during the deposition process when hydrogen remains trapped in the bead. This is a time, temperature and deposition rate dependent process which has been described by A. M. Beers et al "CVD Silicon Structures Formed by Amorphous and Crystalline Growth," Journal of Crystal Growth, 64. (1983) 563–571. For rapid deposition rates of the order of 2–3 micron/minute, which are desired in commercial reactors, the silicon surface temperature must exceed 800° C. Typical rod reactors usually operate above this temperature as do halosilane based fluid bed reactors and thus such reactors do not suffer from this problem. The current silane based commercial fluid bed reactors operate below this temperature in at least part of the reactor and consequently have dusting problems see Gautreaux and Allen U.S. Pat. No. 4,784,840 and require a second dehydrogenation step as described by Allen in U.S. Pat. No. 5,242,671.

The problem of size and shape is not as important but most polycrystalline consumers would prefer large round beads because they flow better and have less surface area, thus less risk of contamination. Large beads require more gas now to fluidize and hence more heat to bring said gas up to operating temperature.

U.S. Pat. No. 4,092,446 by Pedovani describes an optimized system using a fluid bed and extensive recycle of materials. U.S. Pat. Nos. 5,798,137 and 5,810,934 by Lord describe a fluid bed capable of operating with or without recycle on a variety of feedstock. Various fluid bed patent describe methods of operating and of heating. U.S. Pat. No. 5,374,413 by Kim et al. describe use of two feed streams one of which is used to prevent wall deposition, which would block the passage of the microwaves used for heating the beads. There has been much effort to use silane in a fluid bed because it was more concentrated and gave more silicon per mote of feedstock, unfortunately it has proved too prone to sintering at high concentrations and thus all silane fluid bed reactors operate at high dilution rates which negates the benefit of the concentration. Thus a process penalty is paid in producing the silane and an additional penalty is paid in providing high purity diluent.

All these systems take the effluent from the decomposition reactor as it is cooled down and removed from the reactor and then separate and recycle the components. Thus significant effort goes into the recycle process but most prior reactor designs ignore the issue with the exception of Padoveni in U.S. Pat. No. 4,207,360 where he selects a high temperature, 1100° C., to convert the silicon tetrachloride to silicon and thus uses a graphite brick lining coated with silicon carbide. Unfortunately this material contaminated the silicon produced with carbon and thus the process failed commercially as the silicon could not be sold. The above patents by Lord neglect the system integration issue except to suggest that the halogen used to etch the reactor be one that matches the halogens used in the process and Kim also neglects the system integration issue. Instead both point out that the use of silicon oxide is preferred because of its purity and cost and expend a great deal of effort on providing the heat to the reactor in a way which will reduce wall deposits. Kim suggests using microwaves and Lord suggests use of laser and/or chlorine heating in conjunction with microwaves. Heating the reactor up to the even higher temperatures needed to convert silicon tetrahalides make this problem even worse and the attempt is not made. Operating on silane at lower temperatures (600–700° C.) as is done in U.S. Pat. No. 4,784,840 requires low deposition rates and results in dusty product contaminated with hydrogen thus requiring post treatment as described in U.S. Pat. No. 5,242,671.

Other attempts to provide reactor heat include Van Slooten in U.S. Pat. No. 4,992,245 who describes an annular heated fluidized bed operating on silane where the beds enter the heating zone annulus at the top and exit at the bottom back to the reactor and Iya in U.S. Pat. No. 4,818,495 who describes a reactor with an upper heating zone and a lower reacting zone with a cooled gas distribution zone.

Other aspects of reactor design that have received attention are the related problems of managing the size distribution of granules in the reactor, providing new seed particles and selectively removing large particles. Ingle U.S. Pat. No. 4,416,913 described a circulating bed that would selectively remove larger particles and Iya (U.S. Pat. No. 4,424,199) described a boot device for the same purpose. Padoveni described using two temperature zones to increase the natural attrition of the granules at lower temperature. Lord described in more detail a method for segregation using a tapered bed and how the attrition was related to the kinetic power of the incoming jet. Iya in U.S. Pat. No. 4,424,199 describes a fluid jet seed particle generator inserted in a "hydrogen boot" located below the reactor, which was intended to separate the small seed particles from the product.

Recovery of heat from the effluent has not received much attention but Lord described a method for recovering heat from the outgoing beads by a heat exchanger, which heated up the incoming silane.

The primary overall system deficiency in the prior technology is that it neglects the opportunities in the temperature regime between the deposition temperature, which is typically between 750° C. and 1150° C., and the condensation temperature of the halosilanes in the effluent, which as typically below room temperature. The effluent gases are allowed to cool slowly and continue to react through this large temperature range thus producing more of the undesired silicon tetrahalide and condensation and polymerization of silicon dichloride $SiCl_2$ monomer on the walls of the effluent piping to form explosive solids such as $Si_2Cl_6$, $Si_3Cl_8$ and $Si_4Cl_8$, with no effort made to adjust the equilibrium conditions or to quench the reaction.

In this range the species in the effluent change composition with temperature and there is always an optimum temperature for recovery of the desired components, which is typically 800–1000° C. At this temperature the desired hydrohalosilanes such as trichlorosilane and dichlorosilane are at or near a maximum and thus can be recovered which has great impact on the overall silicon and chlorine balance. Addition of the undesirable silicon tetrahalide and hydrogen pushes the equilibrium in the direction of the desired hydrohalosilanes but the reactors must operate hotter and with greater hydrogen recycle to convert the undesired silicon tetrachloride. This in turn results in lower silicon production, more difficult materials problems, greater energy requirements, more production of $SiCl_2$ and $SiCl_3$ monomer and consequent formation of explosive solids. One approach to resolving the said problem of explosive solids is the injection of chlorine or hydrogen chloride in the effluent piping as suggested by Lord. This technique resolves this problem but generates silicon tetrachloride, which is not a desirable product. Another approach is to operate at lower temperature e.g. 800–900° C. where the formation of $SiCl_2$ and $SiCl_3$ monomer is reduced but this lowers silicon production and prevents recycle of silicon tetrachloride in the reactor. This neglect of the overall system optimization issue in the reactor design means that even reactors that are functionally capable of making granular silicon will not necessarily reap the full benefits anticipated. This particularly in the case where it is desired to replace trichlorosilane based rod reactors, which consume silicon to tetrachloride with fluid bed reactors, which do not. This will mean a whole redesign of the facility to accommodate the recycle of the silicon tetrachloride and to generate additional trichlorosilane, which will seriously impact the economics.

A major deficiency of the prior technology in the design of the rectors themselves is in resolving the multiple issues, which surround the supply of heat to fluidized beds for use as silicon deposition reactors. One standard way to heat a fluidized bed is through the walls because the heat transfer from the wall to the particles is very good and wall heaters can be easily and cheaply built using electric heating coils. Another standard way is to preheat the gas reactants. A further standard approach is to recover heat from both the solid and gaseous effluent of the reactor by means of heat exchange. A yet further standard approach is to recycle unused reactant and or carrier gas. In a silicon deposition reactor three are problems facing all of these approaches. If the wall is heated then it is by definition hotter than the bed particles and hence more likely to be deposited on as the reaction rate is strongly influenced by temperature. Hence a hot wall causes wall deposits which are a loss of product, increase the resistance to heat transfer through the wall and can cause breakage of the reactor on cool-down due to differential thermal expansion. There is also the problem that the heat load is localized to the inlet area where the incoming gases are heated up to reaction temperature. Thus hot beds may be present in the reactor but unable to circulate down to the inlet zone fast enough to provide sufficient heat.

Heating the gas reactants is restricted by the thermal decomposition of the silicon bearing gases at around 350–400° C. Thus the gases cannot be heated above this temperature without depositing in the heater or in one inlet to the reactor. This problem is further compounded by heat conducted back into the inlet from hot beads located just above the inlet of the silicon bearing gases. The surface temperature of these beads should be over 800° C. to prevent hydrogen contamination, hence there is a high temperature gradient between the beads at 800° C. and the inlet which needs to be below the thermal decomposition temperature of the silicon containing gases which is 350° C. Recovery of heat is difficult because of the tendency of the silicon containing gas to form wall deposits which in turn means the wall temperature must be below 350° C. which is difficult when cooling gases or solid which are at 800° C. or greater. Recycle of unused reactants or carrier gas is also difficult for the same decomposition reason. The recycle gas must be cooled to below the thermal decomposition temperature of the silicon containing gases before mixing with them.

Thus the prior technology has attempted to deal with the heating issue in a variety of ways. Ingle U.S. Pat. No. 4,416,913, noted the use of microwaves to heat the silicon beads directly through the quartz wall which itself is not heated by microwaves. Poong et al. in U.S. Pat. No. 4,900,411 advises using microwaves and notes the need to cool the wall and the distributor grid in order to prevent silicon deposits, which can then absorb the microwaves. Iya in U.S. Pat. No. 4,818,495 also suggests cooling the distributor grid and providing heating zone above the reacting zone to compensate. Kim et al in U.S. Pat. No. 5,374,413 notes that cooling of the wall is not effective in preventing wall deposits and greatly increases power consumption and suggests a partition between the reacting and heating zone. Ingle see above and Van Slooten in U.S. Pat. have also suggested partitions U.S. Pat. No. 4,992,245. Neither Iya in U.S. Pat. No. 4,818,495 nor Van Slooten in U.S. Pat. No. 4,992,245 provided means for the heated beads to travel down to the reacting area in sufficient quantity to heat the incoming gases and offset the distributor cooling. Lord in U.S. Pat. No. 5,798,137 suggests use of "jet heating" where lasers are used to heat through the inlet jet itself or chlorine is added to react with allane in the jet region. Lord in U.S. Pat. No. 5,810,934, also suggests using an isolation tube between the inner tube containing the silicon containing gases and the outer tube containing the hot beads in order to control the wall temperature of the inner tube below the decomposition temperature. This suffers from the two disadvantages of reducing the heat transfer and the heat transfer rate. Hence only a portion of the available heat can be recovered thus requiring additional bead cooling and the surface area must be larger then would be required other wise. Lord in fact recognizes this and provides an alternate approach using a water-cooled bead cooler.

All the prior technology makes provision for dilution of the silicon bearing gas before the mixture is fed to the reactor stream and so the inlet gas temperature is still limited by the decomposition temperature of the silicon bearing gas, which is typically around 350° C. Kim and Van Slooten also make provision for a separate entry for a carrier gas into the healing zone, which is separated from the reaction zone by a partition, and they claim this gas may be heated up to the reaction temperature although in their examples the actual temperature is below that. In Van Slooten's example the inlet gas is 500° C. compared to reactor temperatures of 650° C. at the top and 550° C. and a heating zone temperature of 660° C. In Kim's examples the carrier gas preheat temperature was 250° C. and 35° C. The prior technology had difficulty in reaching the required high temperatures, greater than 800° C., without contaminating the product or plugging the reactor. These high temperatures are needed, particularly at the gas inlet, for production of hydrogen and dust free product. A critical deficiency of the prior technology, with the exception of Lord in U.S. Pat. Nos. 5,798,137 and 5,810,934, is the failure to recognize the importance of the need to maintain high temperatures according to the experimental data and theoretical relationships in the article of A. M. Beers et al "CVD Silicon Structures Formed by Amorphous and Crystalline Growth," Journal of Crystal Growth, 64. (1983) 563–571. This article details the relationship of temperature, time and deposition rate with higher deposition rates requiring higher temperatures and times in order to crystallize the deposited amorphous silicon and release the codeposited hydrogen.

In the prior technology the inlet area has the most serious problems in product quality because of a combination of factors all of which tend to prevent the needed crystallization to produce polycrystalline silicon and remove hydrogen and/or other codeposited elements such as halogens. This area has the highest silicon bearing gas concentration, the lowest temperatures and the least post deposit time for the beads. The deposit rates tend to be highest at the inlet because of the high silicon containing gas concentrations and the rapid decomposition of the silicon bearing gases once the temperature is above 500° C. The temperatures are lower because the incoming gases are cold and cool the beads near the inlet as the gases warm up. Finally the beads are removed at or near the bottom of the reactor which is also the inlet for the gases thus the beads removed have just been deposited on and hence have little time to crystallize the recent deposits and dehydrogenate. Of these factors the most important one is the temperature because the crystallization rate is strongly dependent on temperature. Frequently the prior technology aggravates this problem by cooling the distributor grid. Thus in the prior technology most of the reaction and deposition ocrurs near the inlet and much of this deposit is unsuitable because of its powdery nature and high hydrogen content. Iya in U.S. Pat. No. 4,818,495 shows a temperature profile where the zone just above the grid is at 500° C. and the top of the bed is at 770° C. Hence the product would be very dusty and contaminated with hydrogen.

Similarly in Van Slooten U.S. Pat. No. 4,992,245 the distributor surface is cooled to a temperature between 200–400° C. and he states in his example that the temperature at the top of the fluidized bed is 923 K. (700° C.) and at the bottom is 823 K. (600° C.). Again the product would be dusty and contaminated with hydrogen. Kim has the reactive gas distributor cooled to 318° C. in his example 2 and has a CVD reaction temperature of 930° C. Since the partition isolates the reaction zone from the hating zone and is half the bed height the beads next to the reactive gas inlet are much colder than the upper part of the reactor as the hot beads from the heater section do not mix with them. These beads are primarily heated through the quartz partition which itself is deposited on by the silicon containing gases in the reaction zone. This silicon wall deposit will be hotter than the beads in the reaction zone and will thus grow at a more rapid rate. The reactor described in the Van Slooten U.S. Pat. No. 4,992,245 also faces this problem of wall deposit on the partition. It is apparent that the provision of a partition does not avoid the problem of wall deposits it merely relocates them to the partition. Thus the requirement for a partition is an additional deficiency in the prior technology. The provision of a partition can help the bead quality if the beads are removed from the healing zone of the partitioned reactor since the beads have more time at a higher temperature without any deposition. Unfortunately such post deposition crystallization and dehydrogenation suffers from the problem that the hydrogen must diffuse out through the complete deposit thickness and this can take several hours or days as shown by Allen in U.S. Pat. No. 5,242,671. This amount of time is usually not available as a practical matter since it requires a significantly larger reactor and also higher temperature (1000–1100° C.).

Lord in U.S. Pat. No. 5,798,137 recognizes the need to remove hydrogen as the deposition occurs in order to minimize the distance the hydrogen has to diffuse out and provides localized "jet heating" at the inlet with lasers and at chlorine. The major deficiencies of this approach are that laser heating is expensive and inefficient and the equipment is high maintenance and chlorine heating is expensive, reduces yield and contributes contaminant. A further deficiency is that success in raising the inlet zone temperature means more heat is conducted back to the inlet, which is not cooled, and thus causes wall deposits within the inlet.

The provision of a partition requires a carrier gas to fluidize the beads on the heating side of the partition. Since this is not a reactive gas it can be heated above the decomposition temperature of the silicon bearing gas and both Kim and Van Slooten claim this feature in their patents. However the sensible heat of the carrier gas is not used to directly heat the reacting beads and neither Van Slooten nor Kim claim the possibility of heating the carrier gas above the reaction temperature. In the example by Kim the carrier gas is 4.0 mole/min of hydrogen at 250° C. and the reactive gas is 3.1 mole/min of trichlorosilane and 6.0 mol/min of hydrogen at 100° C. Neither temperature is above the decomposition temperature of TCS (350° C.) or remotely close to the stated CVD reaction temperature of 930° C. In fact more hydrogen is used as a diluent in the reactive gas than is used as "heated" carrier gas. The CVD reaction temperature of 930° C. is lower trichlorosilane deposition by the hydrogen reduction reaction and will result in lower yield of silicon as is shown in example 1 where the TCS feed is 0.35 mol/min and the silicon deposition rate is 1104 grams over ten hours which calculates to 1.85 grams/min or 0.066 mol/min. This is a yield of 18.8% of the silicon in the TCS. The preferred temperature for hydrogen reduction is above 1000° C. and preferably 1100–1250° C. as noted in Padovani U.S. Pat. No. 4,207,360. Obtaining such temperatures required use of high temperature materials such as silicon carbide coated graphite walls, which could operate significantly hotter than the beads. Unfortunately this approach causes carbon contamination of the silicon making it unusable. The source of the contamination is primarily a reversible gas phase reaction;

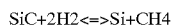

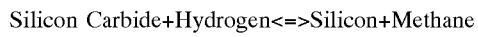

Silicon Carbide+Hydrogen<=>Silicon+Methane

The methane gas is formed at the silicon carbide walls and mixes in with the silicon beads where it decomposes to form silicon carbide thus contaminating the beads. At such high temperatures the silicon carbide diffuses rapidly through the silicon wall deposit to continually replenish the surface.

Thus the approaches taken by the prior technology to heat the reactor suffer from an inability to obtain the desired high temperatures in the inlet region and/or required for high silicon yield without forming severe reactor or partition wall deposits, plugging the inlet or distribution means, resorting to expensive, exotic and unreliable heating means or contaminating the product. A further deficiency of most of the prior technology is its failure to provide sufficient post deposition time at temperature to complete the crystallization and dehydrogenation of the product needed to produce low dust and hydrogen content silicon beads.

A further major deficiency in the prior technology has been the problem of sintering of the granules into large lumps which can occur on the flow distributor or grid on the wall or in the bulk of the bed. The sintering appears to be more prevalent as the temperature, deposition rate, silicon containing gas concentration and bead size increases and less prevalent as the fluidizing gas flow rate increases. Hence a violently fluidized bed will have a lower tendency to sinter but may tend to blow over more dust and will require more heat. Efforts to control the problem at the distributor have included cooling it as described by Iya in U.S. Pat. No. 4,684,513, and Poong, in U.S. Pat. No. 4,900,411. Such efforts have led to large thermal inefficiencies and to problems with dust formation and hydrogen contamination. Lord in the above patents claims that avoiding internals of any kind eliminates the problem of plugging the internals and suggests a single jet. The prior technology did not recognize the inherent contradiction in the technology; it is desired to grow particles without them sticking together. The majority of the growth mechanism is the sticking of small microparticles to the large granules of the bed and the granules must be sticky in order for the micro particles to attach. Lord describes at length the mechanisms involved and discusses the Tamman temperature limit below which the particles are not sticky yet fails to consider the inherent contradiction of assuming the micro particles will stick to the granules but the granules will not stick to each other oven when covered with sticky micro particles. Thus the cooling of the grid can be seen to be effective because the particles are no longer sticky and inherently the granules will be dusty as the dust has not adhered. The observation that high velocities and low feedstock concentrations improves the situation indicates that there is the possibility of operation in a regime where the granules are sticky but can be unstuck from each other when sufficient energy is provided and there is not a huge excess of sticky microparticles. The prior technology did not address this issue but relied on the use of the experimentally observed benefit of high velocities and low silicon containing gas concentrations which compounded the heating and contamination problems of the prior reactors and increased their size and cost because the reactors are larger and there is more external equipment for recycle of the diluent gases.

A yet further deficiency linked to the stickiness of the particles is the failure of the prior technology to effectively segregate out the larger granules for removal as product. Ingle in U.S. Pat. No. 4,416,913 and Iya in U.S. Pat. No. 4,424,199 describe attempts to segregate the particles in a dilute phase and Lord in U.S. Pat. No. 5,798,137 describes segregation in a dense phase using a tapered reactor. All were moderately successful in dry runs without silicon containing gases but not successful with operation with silicon containing gases, because when the silicon containing gases are present the beads are stickier and more violent bed action is required which tends to mix the bed rather than segregating it. This deficiency is also related to the requirement for seed particle generation since removal of only large granules means far fewer particles are removed and hence far fewer seed particles need to be generated. This deficiency is particularly aggravated when the seed particles are generated at the same location that the product is removed, as is the case for both Iya and Lord above since the newly generated seeds are also removed.

Another deficiency of the prior technology is in the appearance of the granules. The granules produced by the prior technology tend to be dusty, dull and misshapen compared to the customers preference (or dust free, shiny and round granules. Gautreaux in U.S. Pat. No. 4,784,840 recognized the need for less dusty granules and provides a reactor with two modes of operation, high deposition and high dust followed by low deposition and low dust to seal in the dust from the previous operation. This is still carried out at low temperature 620–650° C. and merely reduces the dust. Lord in U.S. Pat. No. 5,798,137 describes the mechanism which tends to cause the formation of round beads and its dependence on Reynolds number, unfortunately the required conditions are very difficult to meet for a silane based reactor unless 100% silane is used and the beads are very large. Lord also describes a laser surface annealing techniques which flash melts the surface to provide a shiny finish. The problem with such a technique is applying it evenly to all the surface of a large number of particles and the cost and difficulty of operation of the laser based system.

While the prior technology has usually recognized one or more of the problems involved in the design of fluid beds for silicon deposition none of the prior technology has been able to resolve the design problems without compromising one or more aspects and as a consequence the only commercially functioning fluid bed system, which is designed according to the patents of Allen and Gautreaux, produces a very dusty product that requires additional treatment steps before it can meet specifications and has only a limited market because of the problems of using a dusty material. Other designs have failed to produce a material that meets specifications or have been unable to operate because of sintering or plugging. Finally designs that may be capable of producing specification product and operating successfully tend to use expensive heating methods such as lasers or microwaves and in the cases of trichlorosilane based reactors may not be usable without extensive redesign and construction of the trichlorosilane production facilities. In contrast the proposed technology has resolved the design problems without compromising any major aspects, without using expensive heating techniques or excessive external facilities for recycle and can be used in an existing trichlorosilane facility with only minor changes when used with the optional feedstock recovery system.

SUMMERY OF THE INVENTION

The primary object of the invention is to provide a design for a fluidized bed reactor which make high purity silicon granules in a single reactor which will be safe and easy to operate and commercially viable with a variety of feedstocks and optimized for the overall system efficiency.

Another object of the invention is to make low cost granules.

Another object of the invention is to use a low cost reactor.

A further object of the invention is to have low operating costs.

Yet another object of the invention is to make very large granules.

Still yet another object of the invention is to make round granules.

Another object of the invention is to make shiny granules.

Another object of the invention is to be able to scale up easily.

Still yet another object of the invention is to minimize external support equipment.

Another object of the invention is to maximize silicon yield from feedstock.

Other objects and advantages of the present invention will become apparent from the following descriptions, taken in connection with the accompanying drawings, wherein, by way of illustration and example, an embodiment of the present invention is disclosed.

A Machine for Production of Granular Silicon comprising separate injection of silicon containing gases and non silicon containing gases, heating the non silicon containing gases above the reaction temperature, cooling each injection location of the silicon containing gases, and provision of one or more stages with each stage having a heating section located below a reacting section and a mechanism that pulses granules back and forth between the heating and reacting sections.

Where there are multiple stages each reactor section has one or more injection nozzles for gases which promote additional reaction, in the silane reactor the gas to the reaction section would be silane, for the hydrohalosilane, e.g. trichlorosilane or tribromosliane, reactor the gas to the reactor section could be the hydrohalosilane alone, ultra high purity hydrogen alone or a combination of the two.

Heat is recovered from the granules by direct contact with a high purity non silicon depositing or reacting gases: such gases can be hydrogen, helium, argon, nitrogen, silicon trachloride and silicon tetrabromide and must be low in carbon and oxygen containing contaminants, such as oxygen, water, carbon monoxide, carbon dioxide and methane, which contaminants must be below 1 ppmv, parts per million by volume, and preferably below 10 ppbv, parts per billion by volume. Gases such as silicon trichlorosilane and silane are not usable because they decompose, hydrogen chloride, hydrogen bromide or mixtures of gases, which react such as a silicon tetrachloride, and hydrogen mixture are not usable because they can red with the granules.

The heat exchanger in which the silicon containing gases are heated avoids overheating the wall by using hot liquid or condensing vapor maintained within a temperature range which cannot cause decomposition of the gases, which temperature range is typically between 200–400° C. but more particularly between 300–350° C.

The slaving device by which silicon granules are sieved uses one or more sieves manufactured from non contaminating sieve material and the undersized granules are returned to the reactor and the noncontaminating sleve material is selected from materials which contain silicon such as single crystal silicon, polycrystalline silicon, silicon oxide, silicon nitride, silicon oxynitride and silicon carbide and where the abradable surfaces are low in contaminants such as boron, phosphorus, aluminum, arsenic, iron, copper and other metals, such contaminants will typically be below 1000 ppmwt and preferably below 100 ppmwt.

When used with a hydrohalosilane feedstock such as trichlorosilane it is preferred to use the optional feedstock recovery section, where a silicon quadrahalide such as silicon tetrachloride or silicon tetrabromide is injected, mixed with the reactor effluent then quenched at an optimal temperature (850–950° C.) to recover the silicon hydrohalides such as trichlorosilane and dichlorosilane.

Joints between external equipment and the reactor, which transmit hot gases or solids, are cooled using one or more microchannels positioned and localized to cool the elastomeric O-ring to a temperature such that decomposition of the O-ring or increased permeability of the o-ring to oxygen, water and carbon dioxide does not cause significant contamination or excessive heat loss, such temperature is typically 25–300° C. and preferably 50–150° C. for o-rings made from high purity fluorocarbon o-ring such as Viton, Karez and Teflon.

External flow control of each injection point is preferred and such flow control may be direct with flow control of each nozzle done independently, indirect by means of a flow distribution device such as a manifold of a combination of the two where some nozzles are ganged in groups.

The shape of the pulse and/or the distribution of flow between nozzles may be adjusted to control the generation of new particles without changing the total flow. It is preferred that the flow of gas to each nozzle is controlled before the heater/s and an even more preferred option is where multiple separate flows are heated in the same heater.

In a preferred combination for the use of silane as a feedstock there am two or more stages, high purity hydrogen is used for the non silicon containing gas to the first heating section, for the cooling of the granular silicon and for return of undersize granules to the reactor, the sieving device is made from polycrystalline silicon, the feedstock recovery system is not used, cooled joints are used for all the inlets and outlets of the reactor, the silane heat exchanger uses a condensing vapor maintained in the temperature range 340–360° C. and gas injection location is independently controlled.

In a preferred combination of the above claims for the use of trichlorosilane and/or dichlorosilane as a feedstock, where there are, two or more stages, high purity hydrogen is used for the non silicon containing gas to the first heating section and to the second reacting section, for the cooling of the granular silicon and for return of undersize granules to the reactor, the sieving device is made from polycrystalline silicon, the feedstock recovery system is used and silicon tetrachloride is injected to cool the effluent from 1100° C. to 900° C. and recover hydrohalosilanes for recycle, cooled joints are used for all the inlets and outlets of the reactor, the chlorosilane heat exchanger uses a condensing vapor maintained in the temperature range 340–380° C. and each gas injection location is independently controlled.

In a preferred variation the heater section is of smaller diameter than the reactor section above it and connected by a tapered section, angle of said tapered section to be between 10 and 80 degrees from the vertical and preferably between 30–60 degrees from the vertical.

The heaters used in the heating sections may be resistance heaters, inductive RF heaters, microwave heaters, lamp heaters or lasers but are preferably resistance heaters.

A high efficiency cyclone is used to remove dust from the effluent gases

A silicon etching gas or mixture of gases may be injected through one or more nozzles for the purpose of etching wall deposits from all or part of the reactor, such gases may be elemental halides such as chlorine or bromine, hydrogen halides such as hydrogen chloride or hydrogen bromide or combinations of hydrogen and silicon tetrahalides such as silicon tetrachloride or silicon tetrabromide.

The reactor is supported upon a weigh cell, capable of weighing the reactor and contents and measuring the intermittent force exerted by the pulsing gas and the connections to and from the reactor are flexible enough to allow the slight deflection required by the weigh cell, said deflection to be less than 1 mm and preferably less than 0.5 mm, and the thermal expansion of the reactor relative to the support structure, said thermal expansion to be less than 1" (25 mm) and preferably less than ¼" (6 mm).

A variation on the design is where all or a portion of the non silicon containing gases are heated to a temperature below the reaction temperature outside the heating section then heated to a temperature above the reactor temperature inside the heater prior to entry to the reactor section.

In a yet further variation the second stage heater section does contain some residual silicon dust or silicon containing gases from the first stage reactor section that can form a wall deposit.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

FIG. 4a shows a longitudinal cross section, of a waster-cooled nozzle.

FIG. 4b an expanded detail of the water flow in FIG. 4a.

FIG. 4c is an end view of a water-cooled nozzle shown in FIG. 4a.

FIG. 4d shows the details of the fabrication of the ball joint of the water cooled nozzle shown in FIG. 4a.

FIG. 4e shows the cross section at line B—B of FIG. 4d.

FIG. 4f shows the details of the fabrication of the nozzle tip and reactor connection of the water cooled nozzle shown in FIG. 4a.

FIG. 4g shows the cross section at line C—C of FIG. 4f.

FIG. 5 shows a layout of the silicon containing gas heater using heat transfer fluid and alternates of internal and external heating of the fluid.

FIG. 6b shows an alternative design of the sieving system.

FIG. 6c shows a cross section at line A—A of FIG. 6b.

DETAILED DESCRIPTION OF THE PREFERRED EMBODIMENTS

Figure 1A:
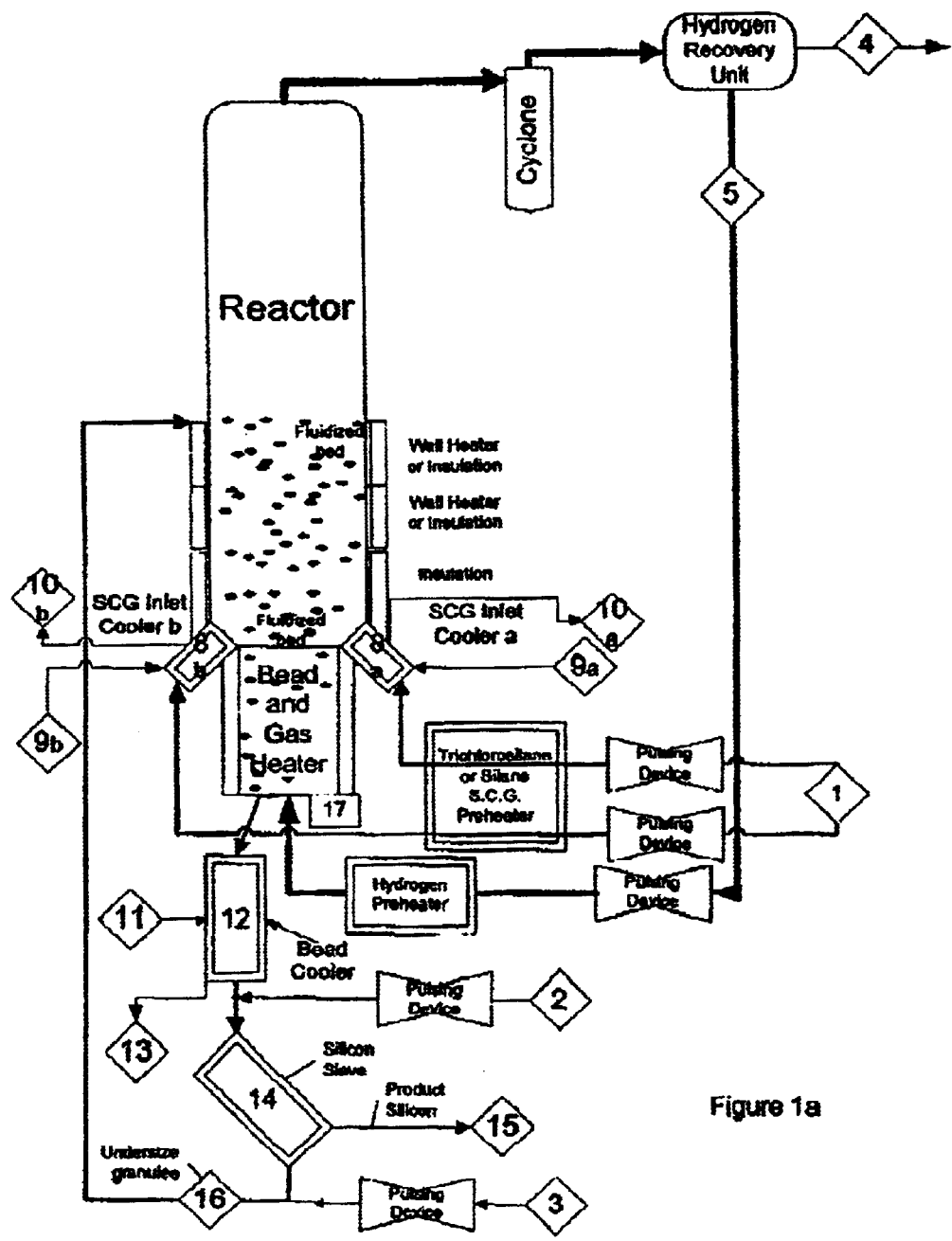
FIG. 1a shows the basic way in which the inventions may be combined in a machine for the production of granular silicon.
Figure 1C:
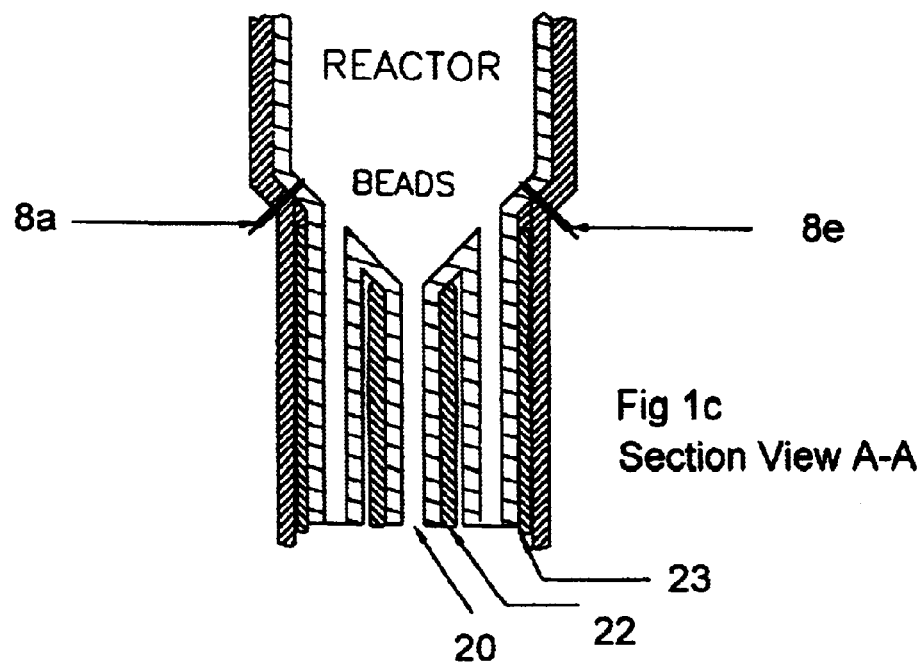
FIG. 1c shows a cross section along line A—A of FIG. 1b.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. In order to produce high purity silicon suitable for use in semiconductor or photo voltaic applications it is necessary to form and purify a liquid or gaseous silicon containing material then decompose that material back to solid silicon. Processes to do this have been patented using materials that contain silicon and hydrogen and/or halogen such as chlorine, bromine or iodine. Such materials include silane, trichlorosilane, dichlorosilane, silicon tetrachloride, tribronosilane etc. it is also common to include a diluent, which may partake in the reaction such as hydrogen or be inert such as argon. It is most desirable to recover the material in a convenient pellet or granular form and to have a low cost energy efficient conversion process and to convert as much of the feedstock as possible to usable product. Many patents have Identified fluid beds as the appropriate technology to accomplish these aims. Implementation of the fluid bed technology has proved difficult and one of the most difficult problems has been providing sufficient heat at the inlet of the reactor. The hating problem has led to compromises in other areas notably purity and feedstock conversion.

Lack of heat when using silane leads to hydrogen contamination of the product and a dusty product that is not very usable although most of the silane is converted. Lack of heat when using trichlorosilane, or other halogen containing feedstocks, leads to poor feedstock conversion. Attempts to increase the feedstock conversion require higher temperatures and lead to contamination from high temperature materials of construction such as graphite or silicon carbide, operating with low feedstock conversion leads to increased cost. In feedstock production and byproduct disposal or use of more expensive production methods which use higher pressures and temperatures to recycle the byproducts.

Another major problem has been sintering of the granules either at the reactor entry or in the body of the bed of particles. Methods of dealing with this problem have been cooling the beads at the entry, using low concentrations of the silicon depositing gas and operating with very vigorous fluidization. Cooling the beads at the entry exacerbates the inlet-heating problem discussed above as does operating with vigorous fluidization. Using low concentrations of the silicon depositing gas leads to the uses of large amounts of inerts and the consequent problems of the higher capital and operating cost required to recycle, heat and purify the inerts, which must be maintained exceptionally pure.

A further related problem has been controlling the particle size of the granules in the reactor. It is desired to produce beads that are large and of a narrow size distribution but the reactor fluidizes better with a wide size range and it is desired to minimize contamination in the production of seed. Previous methods of dealing have some or all of the following techniques; particle separation and grinding of seed particles and reintroduction of the seed to the reactor and have done them either internally or externally to the reactor. The problem with external techniques has been the contamination and difficulty of control since there is a long lag time (1–2 days) between introduction of small seed particles and their growth to product size. Internal techniques have suffered from the difficulty of separating large granules out and of generating sufficient seed.

This proposed machine for production of granular silicon incorporates several novel features into its design in order to overcome the above problems without the compromises inherent in the prior technology. The main novel features are: separating the heating of the silicon feedstock gases from the non silicon containing gases and heating the latter to a temperature above the reactor temperature; heating the granules in a heater section and using the pulsing of the gas flow to move the beads into and out of a reactor section; cooling only the localized area around the silicon feedstock entry and minimizing said entries; providing non-contaminating sieving and grinding techniques for online removal of large product granules and online or offline grinding of seed granules; a feedstock recovery subsystem which can recycle the byproducts to extinction and providing multiple heater/reactor stages in one vessel.

Additional novel features are: heat recovery from granules by direct contact with non silicon containing gases;

external flow control of each injection point; heating of the silicon containing gases by a liquid or vapor whose temperature is not high enough to cause decomposition of the gases, measuring reactor weight and pulsing force continuously and using one or more high efficiency cyclones to removes small diameter dust.

Additional benefits of the design are that separating the heater and reactor section enables the use of cheap resistance heaters and of different diameters for the two sections, the pulsing action itself polishes the granules, recirculation and reinjection into the reactor of the undersize granules provides new seed particles.

In accordance with the present invention, FIG. 1a shows a basic version of the invention incorporating several of the novel features in an integrated design that is suitable for production of granular silicon from any silicon containing gas (e.g. silane, dichlorosilane, tribromosilane or trichlorosilane). The recycle of solids is done using a pulsing technique where most of the hot granules in the heater zone are pushed up into the entry of the reactor by a pulse of gas into the bottom of the heater, Stream 5. At the end of the pulse, colder solids fall down by gravity into the heater for heating and recycle upwards during the next pulse. The pulsing of the beads and gas also provides additional agitation of the bed compared to the agitation provided by the equivalent continuous flow. Such agitation is particularly useful for silane-based systems, which are primarily limited by the related operational problems of agglomeration and plugging and have been limited to low silane concentrations in the feedstock. Thus the additional heat and agitation provided by pulsing can be used to increase the silicon feedstock flow, stream 1, and thus increase the silicon production, Stream 15. In FIG. 1a, stream 1 is shown as broken into to streams, each of which have their own pulsing devices and inlet coolers 8a and 8b, which are cooled by inlet water flows 9a and 9b and drained by outlet water flows 10a and 10b.

Additional streams typically provided for use in purging lines, initial fluidizaton, wall deposit etching and shutdown are not shown but are required as is usual for such reactors. Such streams include argon and/or nitrogen for purging and fluidization during startup and shutdown and an etching gas such as chlorine or hydrogen chloride for wall deposit etching at the end of the run prior to shutdown. The reactor is supported on a weigh cell or cells, 17, which can provide continuous information on the weight of the reactor and bed and the force of the pulses. Since the pulses are regular and at a known frequency this information can be separated from the longer term weight changes by standard frequency analysis techniques. In order to provide accurate information the lines connecting to the reactor must be flexible enough to avoid interfering with the displacement of the weigh cell. Such flexibility is also required to prevent damage to the quartz reactor and allow for differential thermal expansion. This flexibility requirement is one reason for the use of the water-cooled ball joint connections with elastomeric O-rings for the nozzle connections, which are shown in FIG. 4a–g. An example of silicon deposition using the design similar to that shown in FIG. 1a but with three silane inlet, three pulsing devices and three inlet coolers, three water inlets, and water outlets instead of the two inlets shown in FIG. 1a is as follows:

A quartz vessel consisting of a bead and gas heater zone of 90 cm length and 5 cm in diameter and an insulated reaction zone of 600 cm length and 10 cm diameter was loaded with a 240 cm bed of 850 micron average diameter silicon beads. The three silane inlets for stream 1 were located 100 cm above the bottom of the vessel. The reactor, effluent piping and cyclone are well insulated.

The reactor was brought up to 750–800° C. using argon as a heating and fluidizing gas through stream, 5, with a small purge stream flow through stream 1. Most of the argon was received through stream 5 with some being vented to the effluent gas stream, 4. The hydrogen preheater and the bead/gas heater were set at 900° C., the SCG vapor temperature heater was set at 350° C. The upper wall heaters were set at 850° C. The pulsing of the argon flow on streams 1, 2 and 5 was stared at 0.25 cycle per second in phase. A small cooling water flow of 20 ml/min for each cooling water streams 9a, b & c, 9c not shown in FIG. 1a, was started to the silane inlet cooling devices 8a, 8b, 8c, 8c not shown in FIG. 1a, to provide thermal isolation of the inlet from the reactor temperature. The inlet water temperature was 35° C. and the outlet temperature of the exit cooling water streams, 10a, b & c, 10c not show in FIG. 1a, was 57° C. for a parasitic heat loss of 90 watts. A small flow, 1 SLM, of argon was started through stream 2 to the bead cooler, 12, and a flow of 1 SLM of argon was started to the granule recycle line 16 and silicon sieve, 14, through stream 3. A small flow of water (100 ml/min) was started to the bead cooler, 12, through stream 11 and exited via stream 13. Then high purity (less than 2 ppmwt carbon oxides and less than 2 ppmw methane) hydrogen was bled into all four streams 1, 2, 3 & 5 to displace the argon with the recycle, 5, partially closed and effluent gas stream 4 opened more. Once the reactor was at temperature and operating on hydrogen the temperature of the vapor in the silane heater for stream 1 was controlled at 350° C. and silane was slowly introduced. Pulsing continued at 0.25 cycles per second. Simultaneously the temperature of the hydrogen/bead heater at the bottom of the reactor was increased to design conditions of 1000° C. for the heater temperature. At stable operating conditions the silane flow, 1, and the recycle hydrogen flow, 5, varied between 30–300 SLM to provide the pulsing and were in phase with each other. The individual silane flows each varied between 10–100 SLM in phase. Average bad temperature was 860° C. at the bottom, dropping to 840° C. at the top of the bed and 685° C at the top of the reactor. Recycle gas from the cyclone was at 410° C. and from the hydrogen recovery unit was 100° C. The bed was observed to be slugging vigorously at the pulsing cycle of 0.25 cycle/sec and some dust was carried over into the cyclone but pressure drop was stable during the run.

Beads were removed by adjusting the hydrogen flow and pulsing cycle of stream 2. As a pulse of beads left the bead cooler, 12, and went into the silicon sieve, 14, beads from the reactor fell into the bead cooler, 12. The beads going in to the silicon sieve, 14, spread out and either fell through the sieve or were retained and exited as the product stream 15. The beads falling through the sieve were moved by the pulsing of stream 3 back into the reactor via the granule return line 18. The pulsing of stream 3 also assisted in preventing blinding of the sieve, 14. Initially the majority of the beads were smaller than the sieve opening of 1.2 mm and so were recycled. At stable operation the bead removal rate of stream 15 was 13.5 Kg/hr and the bead exit temperature was 80 C. As the bead removal rate was increased the flow of hydrogen through stream 2 was increased and the flow through the hydrogen preheater was decreased while maintaining the total flow of 30–300 SLM. The flow of stream 3 varied between 10–100 SLM. Thin wall deposits were formed but could be etched off easily at the end of the run. After the run the mass balance showed the deposited silicon was about 95% of the theoretical yield and no major agglomerates were seen. Power to the hydrogen/bead heater was 3 kW on average. Power to the silane heater was 3 kW on average. Power to the hydrogen preheater was 5 kW initially decreasing to 3 kW as the hydrogen flow to the preheater was reduced by the increase in flow to the bead cooler, 12. Power to the upper wall heaters varied between 3 and 5 kW depending on the amount of cold undersize granules recycled to the reactor. Total power was 12 to 16 kW for a production rate of 13.5 kg/hr, which is about 1 kW/kg. Energy requirements are based on a silane vapor feed.

Figure 1B:
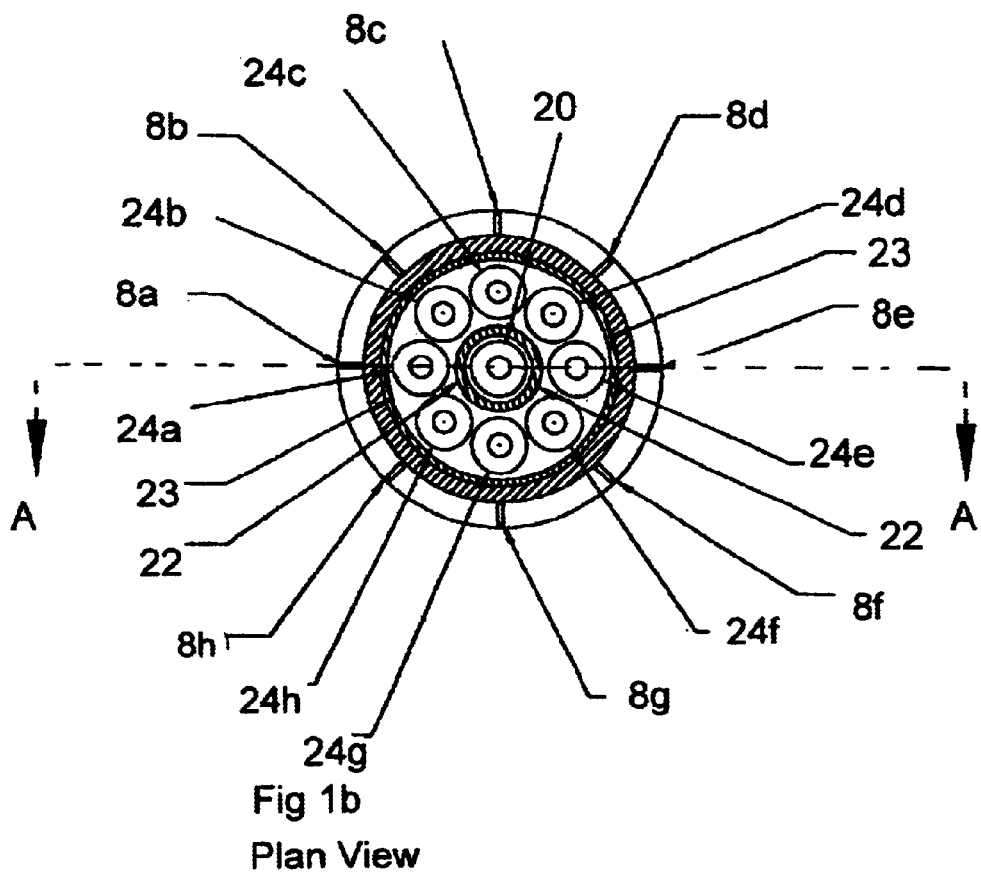
FIG. 1b shows a plan view of multiple tubes and heaters used in the heating of a larger reactor.

Scale up of these reactors is much more feasible than in previous technology as is illustrated in FIGS. 1b & c. The diameter of the main reactor is increased from 10 cm to 50 cm which means increasing the cross-sectional area, throughput and heat input requirements by 25 times. The bead heaters need to deliver 25 times more heat and so must increase in surface area and/or in the temperature of the heater.

In the example, shown in FIGS 1b & c, a center tube, 20, is increased to 10 cm thus doubling the surface area per foot and an additional 8 tubes, 24a–g, each 10 cm in diameter are provided in an outer ring. This provides 17 times the surface area per foot and the length of the heaters is increased by 50% thus providing 25 times the surface area. Alternatively the length could be increased by 30% and the temperature difference from the heater to the tube increased by 20% from 50 deg C. to 80 deg C. to provide the additional heat transfer. Thus there are three parameters that may be adjusted to provide the extra heat transfer, the surface area/ft, the length and the temperature difference. In practice a higher temperature difference shifts the frequency of the radiant heat towards the visible and more is transmitted through the quartz, which is an additional benefit. It is also necessary to increase the number of silicon containing gas inlets and here it is shown that 8 inlets, 8a–g, are provided for the 25-fold increase in flow. Increasing the inlet diameter and/or the pressure drop across them can do this. The fraction of heat input lost to parasitic heat loss from cooling the nozzles decreases by a factor of three.

In this design the heater elements are arranged in two rings an inner ring 22, and an outer ring 23. This provides an efficient furnace. The outer ring is insulated, 23, on the outside, top and bottom. The top of the inner ring heater may or may not be insulated depending on the distance of the heater from the silane inlet nozzle. In general for larger reactors it is not insulated, as shown, to provide more heat and in smaller reactors it is insulated to reduce the wall deposits. Gas flow to each tube is pulsed and this may be done in any convenient fashion providing that the flow is evenly distributed. Since it is convenient for bead removal to be done via the center tube, this tube will normally have its own flow controller.

Figure 2:
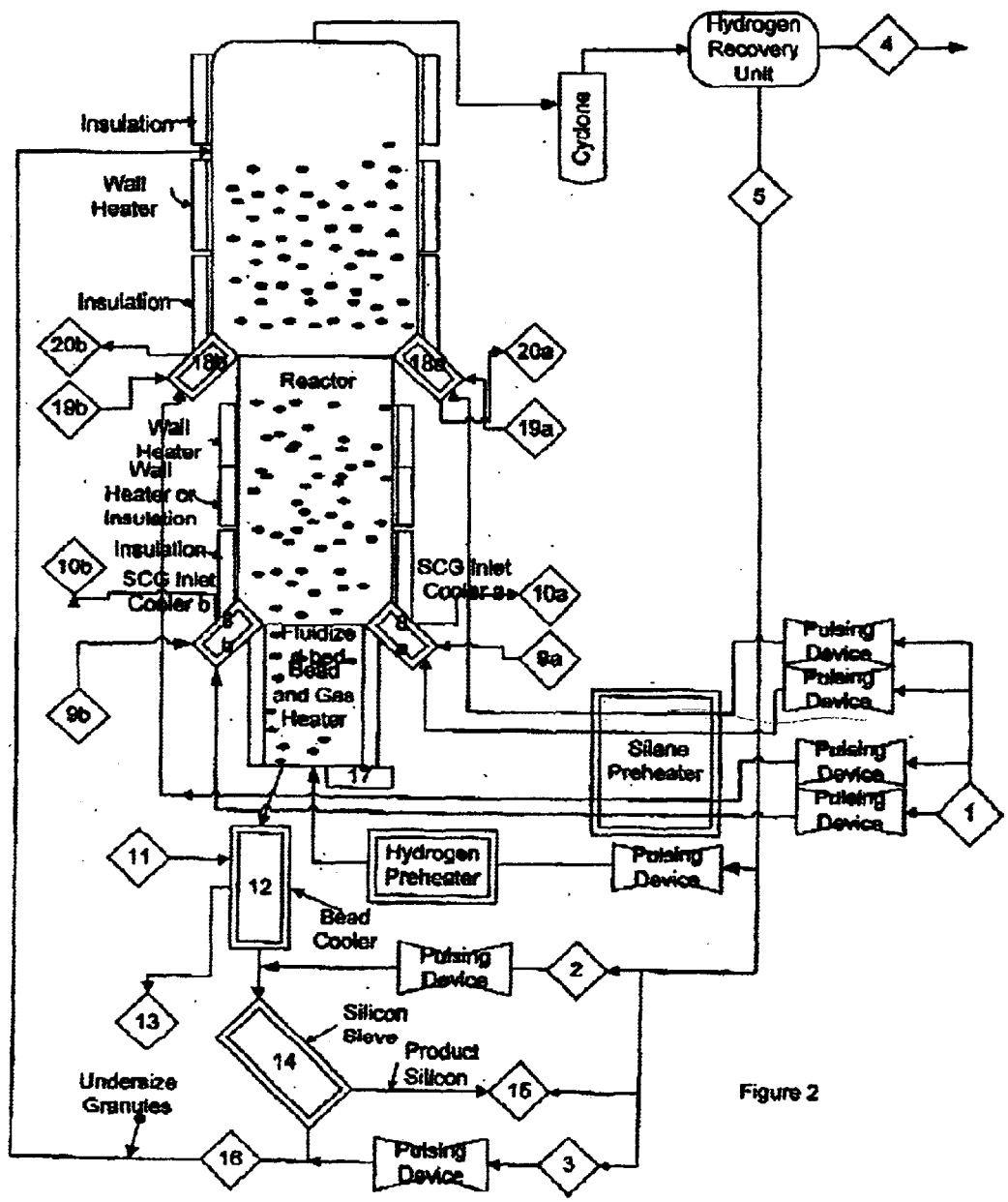
FIG. 2 shows a more detailed schematic of a preferred method to design a silane fluid bed reactor using dual stage injection of silane.

An example of silicon deposition using a dual stage reactor that is designed for silane and is similar to the design shown in FIG. 2 but with six silane inlets, each with an associated pulsing device, inlet cooler, water inlet and water outlet, instead of the four inlets shown in FIG. 2 is as follows.

A quart vessel consisting of a lower bead and gas heater zone of 90 cm length and 5 cm in diameter and a lower insulated reaction zone of 150 cm length and 10 cm diameter and an upper bead and gas heater zone of 90 cm length and 10 cm in diameter and a upper insulated reaction zone of 570 cm length and 13 cm diameter was loaded with a 480 cm bed of 850 micron average diameter silicon beads. The reactor, effluent piping and cyclone are well insulated. The hydrogen preheater and the bead/gas heater were set at 900° C., the SCG heater vapor temperature was set at 350° C. The lower wall heaters were set at 950° C. and the upper wall heaters were set at 850° C. The pulsing of the argon flow on streams 1, 2 and 5 was started at 0.25 cycle per second in phase. A small cooling water flow of 20 ml/min each was started through cooling water inlet lines 9a, b & c, 9c not shown in FIG. 1a, and 19a, b & c, 19c not shown in FIG. 1a to the silane inlet cooling devices 8a, 8b, 8c, 8c not shown in FIG. 1a and 18a, b & c, 189c not shown in FIG. 1a to provide thermal isolation of the inlet from the reactor temperature. The inlet water temperature was 35° C. and the outlet temperature was 57° C. at the cooling water exit lines, 10a, b & c, 10c not shown in FIG. 1a and 20a, b & c, 20c not shown in FIG. 1a for a total parasitic heat loss of 180 watts. Other conditions and start procedures were done as for the example above. At stable operating conditions the silane flow, 1, varied between 60–600 SLM and the recycle hydrogen flow, 5, varied between 30–300 SLM to provide the pulsing and were in phase with each other. The individual silane flows 1a, b, c, d, e & f each varied between 10–100 SLM in phase. Average bed temperature was 860 C at the bottom, dropping to 840° C. at the top of the bed and 665° C. at the top of the reactor. Recycle gas from the cyclone was at 400° C. and from the hydrogen recovery unit was 100° C. The bed was observed to be slugging vigorously at the pulsing cycle of 0.25 cycle/sec and some dust was carried over into the cyclone but pressure drop was stable during the run.

Beads were removed as in the example above. The flow of stream 3 varied between 20–200 SLM. The wall deposits that were formed were thicker than in the first example but still could be etched off easily at the end of the run. After the run the mass balance showed the deposited silicon was about 95% of the theoretical yield and no major agglomerates were seen. Power to the hydrogen/bead heater was 3 kW on average. Power to the hydrogen preheater was 5 kW initially decreasing to 1 kW as the hydrogen flow to the preheater was reduced by the increase in flow to the bead cooler. Power to the silane heater was 6 kW on average. Power to the lower wall heaters was 3 kW on average. Power to the upper wall heaters varied between 5 and 7 kW depending on the amount of cold undersize granules recycled to the reactor. Total power was 22 to 24 kW for a production rate of 27 kg/hr, which is about 0.8–0.9 kW/kg. While not shown it is also possible to provide a recycle bead heater on stream 16 which will reduce the load on the upper wall heater and thus tend to reduce wall deposits in that area.

Figure 3A:
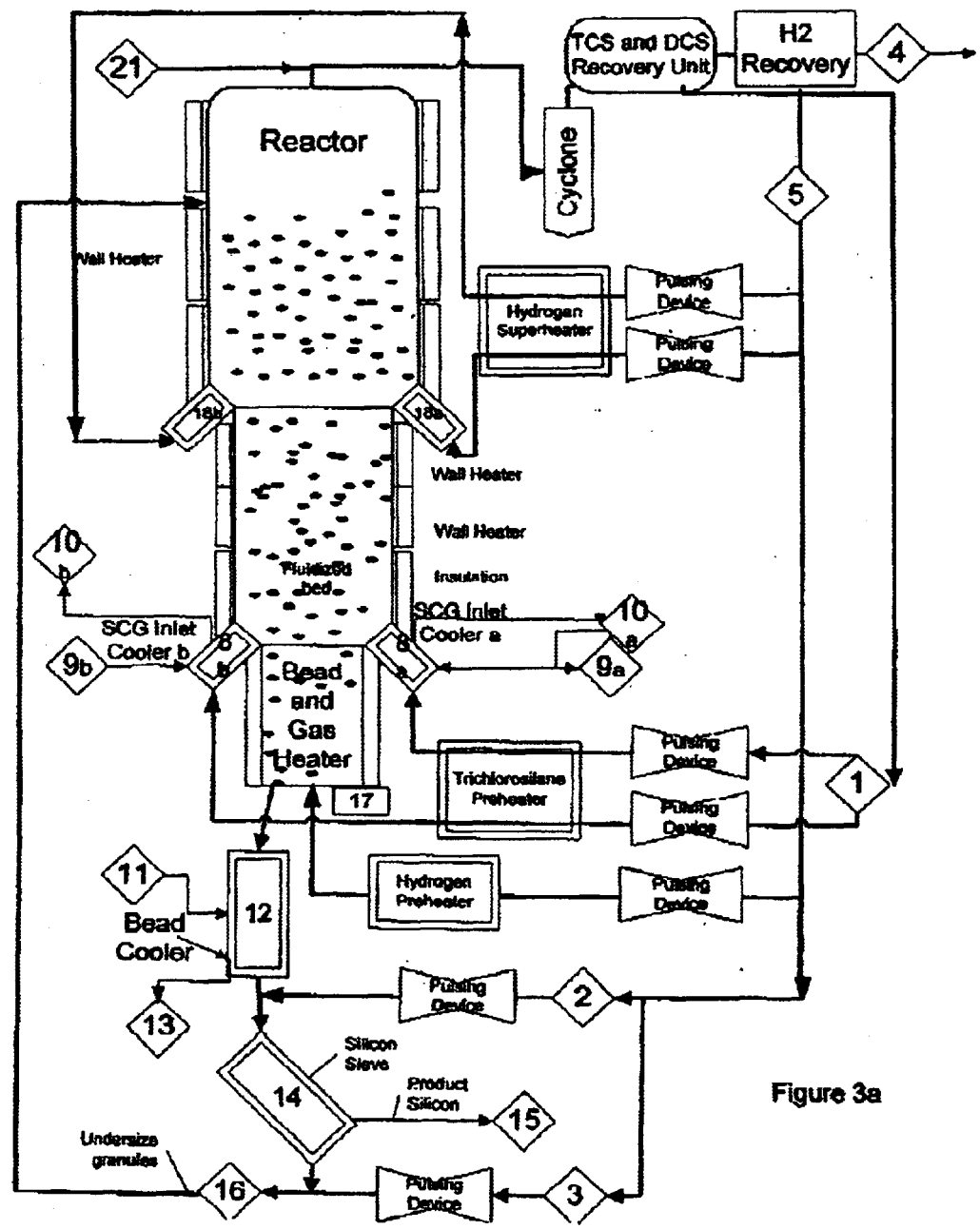
FIG. 3a shows a more detailed schematic of a preferred method to heat a trichlorosilane fluid bed reactor using a second stage with injection of hot hydrogen gas and TCS and DCS recovery.

An example of silicon deposition using dual stages and designed for trichlorosilane using a design similar to that shown in FIG. 3a but with 3 Trichlorosilane inlets, and 3 hydrogen inlets, and associated pulsing devices and inlet coolers, water inlets, and water outlets, instead of the 2 trichlorosilane and 2 hydrogen inlets shown in FIG. 3a is as follows:

The same quartz vessel and silicon granule bed as used in Example 2 is used. A hydrogen superheater is supplied capable of heating hydrogen to 1300° C. using Kanthal heating elements. The important function of increasing the yield of silicon from trichlorosilane is shown using gas heating in conjunction with wall heating. In the trichlorosilane decomposition there are two main reactions; thermal decomposition to silicon and silicon tetrachloride and hydrogen reduction to silicon and hydrogen chloride. The second reaction produces more silicon per mole of trichlorosilane but requires dilution with hydrogen and higher temperatures.

Since the reactions are equilibrium reactions the products of the reaction of the reaction inhibit the reaction so direct recycle of effluent is not advisable. Instead the residual hydrogen must be extracted from the effluent and recycled through an external hydrogen recovery system and some additional hydrogen is required. In this reactor the lower stage operates at lower hydrogen to TCS ratio and at a lower temperature so the thermal decomposition reaction is more important. In the upper stage the hydrogen to TCS ratio and the temperature is increased thus using the hydrogen reduction reaction to obtain additional yield of silicon. Since the TCS is fed as a liquid some changes were made to the metering equipment and to the preheater which now also was to be used as a vaporizer. The heat requirement were a little less than for silane because of the lower TCS flow. In order to maintain the pulsing, spray nozzles and liquid solenoid valves were placed directly on the inlet to the vaporizer.

A small cooling water flow of 60 ml/min was started to the silane inlet cooling devices 8a, 8b, 8c, 8c not shown in FIG. 3a, (20 ml ea) and 90 ml/min to 18a, b, c, 8c not shown in FIG. 3a, (30 ml ea) to provide thermal isolation of the inlet from the reactor temperature. The inlet water temperature was 35° C. and the outlet temperature was 57° C. for 8a, b & c and 65° C. for 18a, b & c for a parasitic heat loss of 270 watts. Other conditions and start up procedures were done as for the example above. After startup on hydrogen was achieved with the bed at 850° C. the temperatures of the hydrogen/bead heater at the bottom of the reactor was increased to 1000° C., the lower wall heaters were increased to 1050° C. and the upper heaters to 1150° C.

At stable operating conditions the trichlorosilane/dichlorosilane (98% TCS) flow in stream 1 was 12–120 SLM (4–40 SLM per injector) and the temperature was 350° C., the ultra pure (less than 0.2 ppmwt carbon oxides and 0.2 ppmwt methane) hydrogen flows in stream 5 and 17 were varied between 30–300 SLM and the hydrogen flow to the bead cooler was 2–20 SLM. Bed temperature was 860° C. at the trichlorosilane inlet, increasing to 1100° C. at the top of the bed and 1050° C. at the top of the reactor. Beads were removed as in the example above. The flow of stream 3 varied between 2–20 SLM. Silicon tetrachloride vapor, 21, was added to the top of the reactor at a temperature of 100° C. and flow of 75 SLM. The gas exit temperature from the cyclone was at 900° C. and from the hydrogen recovery unit was 20° C. The wall deposits that were formed were thicker in the wall heater zones but still could be etched off easily at the end of the run. After the run the mass balance showed the deposited silicon was about 95% of the theoretical yield and no major agglomerates were seen. Power to the hydrogen/bead heater was 4 kW on average. Power to the trichlorosilane vaporizer/heater was 2.5 kW on average. Power to the hydrogen preheater was 5 kW, to the hydrogen superheater was 10 kW. Power to the lower wall heaters was 3 kW on average. Power to the upper wall heaters varied between 6 and 7 kW depending on the amount of cold undersize granules cycled to the reactor. The silicon production was 1 kg/hr, which is about 25% of the silicon in the TCS. Power required was about 30 kW/kg. Energy requirements are based on a trichlorosilane liquid feed. It should be noted that in a dedicated TCS reactor the upper injectors for superheated hydrogen only need to be cooled at the joint not at the reactor penetration, which would save a small amount of heat (about 150 watts). The energy required to vaporize and heat the silicon tetrachloride is not included because this is part of the recovery operation. Ultra pure hydrogen is required because of the greater hydrogen to silicon ratio in this reactor compared to a silane reactor. The specific level of purity required for the hydrogen diluent may be calculated by mass balance based on the silicon specification and the assumption that all carbon entering the reactor leaves in the silicon product.

Figure 3B:
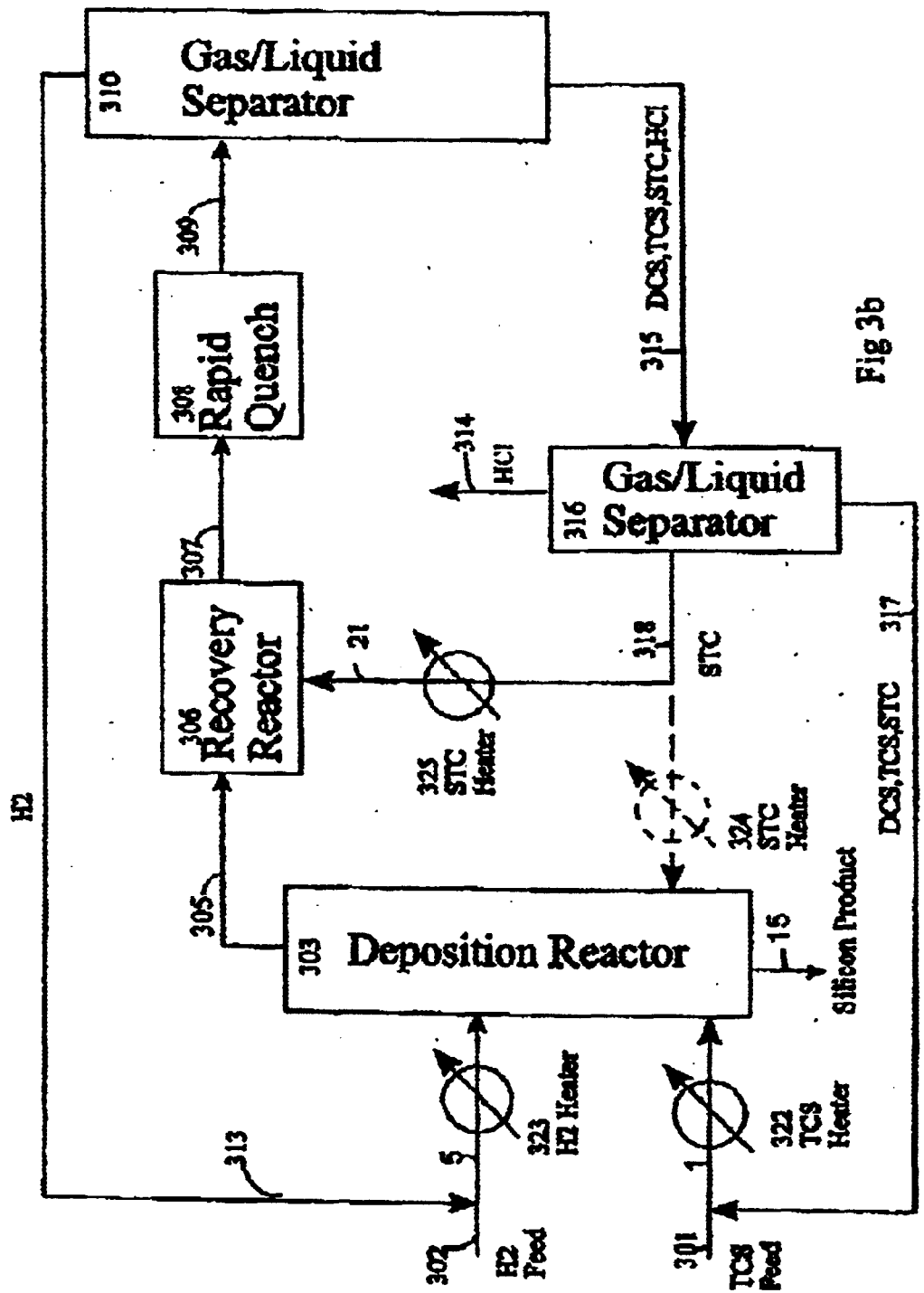
FIG. 3b is a schematic diagram illustrating one way in which the concepts of the invention for recovery of TCS and DCS can be combined into a complete reactor system.

The benefit of injecting the silicon tetrachloride at the top of the reactor is to move the equilibrium conditions so as to recover additional feedstock. The schematic of this subsystem is shown in FIG. 3b. The silicon feedstock stream, 301, is mixed with the recycle stream 317 to form reactor feed stream, 1 which is heated in the TCS heater, 322, to a temperature below its thermal decomposition temperature. The hydrogen is feedstock stream, 302, is mixed with the recycle stream 313 to form reactor feed stream, 5 heated in the hydrogen heater, 323, and then reacts in the reactor, 303. The use of multiple heaters and injection points as done in the preferred embodiment of the reactor does not affect the basic schematic. The silicon product leaves the reactor as Stream 15.

The stream 305 enters the recovery reactor 306 (corresponding to the effluent piping and cyclone of FIG. 3a) where it is preferably combined with the STC stream 21 and cools and reacts to reform the desired feedstock. This stream, 307, exits the recovery reactor and enters the rapid quencher, 308, where the gases are cooled rapidly to prevent decomposition of the newly reformed feedstock. The stabilized gases, 309, exiting the quench are then cooled further in the gas-liquid separator, 310, to condense most of the silicon containing species and the condensed liquids, 311, are separated from the uncondensed gases, 310, which are primarily hydrogen and hydrogen halides and are further treated in a gas separator, 312, to provide a stream, 313, that is primarily hydrogen and a stream, 314, that contains most of the hydrogen halide. This gas separator can be a cryogenic device, an absorption or adsorption device, a membrane device or any combination thereof. The liquid stream, 315, is then processed in a liquid separator, 316, into a stream, 317, which is primarily silicon hydrogen halides and a stream, 318, which is substantially free of silicon hydrogen halides. All or part of stream 318 may be recycled to the recovery reactor, 306, through STC heater, 324 as stream 21 or sent directly to the decomposition reactor, 303, through STC heater 325 as in the prior art. As discussed earlier returning the STC stream directly to the decomposition reactor has significant disadvantages which why it is not the preferred option. The separator, 316, will typically be a distillation column but any techniques are suitable which will provide good separation. The required degree of separation is determined by economics but typically the purity of each stream would be about 98–99%. The benefit of such a scheme is that the effluent from the system is only stream 314 which contains mostly hydrogen chloride which can be directly recycled to react with silicon to make more TCS at >90% yield. There is no recycle of pure silicon containing materials back to the low purity TCS manufacturing unit and there is no waste STC stream that must be converted to low value silica. Thus while the preferred reactor subsystem is more expensive to build and operate than one without feedstock recovery and thus designed with lower hydrogen flows and higher TCS flows the overall system is more economic because of reduction in costs of the remaining systems. A further reason for this preferred design is that it can easily be substituted for the standard existing rod reactors because they also recycle the STC to extinction. Use of apparently cheaper reactors which do not fully convert the silicon content in the TCS as substitutes for existing rod reactors would mean either a reduction in silicon output or the need for expansion and modification of the TCS production and purification facilities.

A key feature of the machine is the localized cooling of the silicon containing gas injector nozzles. FIGS. 4a–g shows one way this may be implemented. FIG. 4a is a cross section of the nozzle assembly. The silicon containing gas at about 350° C., stream 401, comes in through the ball joint, 402, which is sealed by an elastomeric o-ring, 403, positioned in an o-ring groove, 404, and which is cooled by water flowing through a micro-channel, 405, directly under the o-ring groove. It proceeds through the inside of the inner quartz tube 406, which tapers down as it enters the reactor, 407. The tip of the nozzle, 416, is cooled by water flowing through the circumferential micro-channel, 408 which is cut into the outer wall of the inner tube, 406 and sealed against the inner wall of the, outer tube, 409. Water flaws from the water inlet 410, to the ball joint micro-channel, 405, via a micro-channel, 411, which is cut into the outside of the inner tube 403 and then goes to the tip micro-channel, 408, via a micro-channel, 412 on the other side of the outside of the inner tube 406. This water is returned to the outlet, 414, via a return micro-channel 413. There several features which are important. The machining of the circumferential micro-channels must ensure that the water flows evenly on both sides. The water in the circumferential micro-channels must flow fast enough, 10–100 cm/s, to obtain good heat transfer at the tip. The supply and return micro-channels must not cross each other. In FIG. 4a the incoming cold water goes first to the ball joint via 411 then to the tip via 412 and is returned via 413 which is separated from 411 by an uncut section of quartz between the inlet and outlet water tubes, 410 and 414. FIG. 4b is an enlarged drawing of the section between the inlet and outlet water tubes, 410 and 414 to better show the water flowpath. FIG. 4c shows an end view of the nozzle and illustrates how the inlet tube 410 may be bent away from exit tube 414 to provide access for connections. This design provides higher flow rates than if the flow was divided and avoids the problems of starving one section through flow maldistribution. It is of course possible to have more than one circumferential micro-channel providing good engineering practice is followed in design and fabrication to prevent flow maldistribution. FIG. 4d–g shows some details of the nozzle tip and ball joint. In FIG. 4g the nozzle tip micro-channel, 408, is shown as a micro-channel that is 3 mm wide and 0.2 mm deep with its far end 1 mm from the end of is the nozzle. The nozzle tip 416 is rounded which reduces chipping damage and removes a hot spot on the end of the nozzle where deposition might occur. The nozzle is supported by 4 quartz nibs, 415, which provide additional strength without contributing much to the heat transmitted back to the nozzle from the reactor wall. In the FIG. 4f which is a cross section A—A, the four quartz nibs, 415, are shown to have little area in contact with the nozzle and the circumferential water channel 408 is shown as an annular space. In FIG. 4e which is the cross section B—B the supply, 412, and return, 413, micro-channels are shown as sectors produced by grinding flats on the outer wall of the inner tube 406. It is of course possible to grind multiple flats or to grind other shapes providing that the strength of the inner tube is adequate after grinding and that the hydraulic diameter of the micro-channel is large enough to allow the required cooling water flow at the available pressure drop. In the FIG. 4d the ball joint is shown as a standard 18/7 ball o-ring joint with a diameter of 18 mm at the widest end of the o-ring groove, 404, a tube outside diameter of 9.5 mm and a nominal internal diameter of 7 mm, sealed to the inside of this is a 5–7.25 quartz tube which has been OD ground to fit tightly. The tight fit provides the water seal between the entrance and return water lines. Circumferential micro-channels are cut in the outside of this inner tube to provide the cooling at the ball joint and tip and flats are ground to provide the water connections. The inner and outer tubes are assembled, welded, annealed, ground to obtain the final shape then add treated to improve the surface finish and strength. The water connections shown are standard 12/2 ball o-ring joint with a diameter of 12 mm at the widest end of the o-ring groove, a tube outside diameter of 6 mm and a nominal internal diameter of 2 mm. The relatively thick wall, 2 mm, is beneficial in preventing accidental breakage. The problem of accidental breakage is a major design issue for these quartz injectors because of the safety issues involved in handling pyrophoric materials. Simply making the injectors very large with thick walls increases the heat transmission back from the reactor and even such designs are prone to breakage if sufficient force is applied particularly if there is a lever action involved such as is the case with the injectors since they must penetrate the insulation. Thus it is important to prevent movement of the nozzle so the rigid insulation used has recesses cut in the top to support the water connections. It is also important to prevent force being applied to the end of the nozzle by the connections so they must be very flexible. The water connections can be small diameter ⅛ inch tubing and coiled helically to provide flexibility. The silicon containing gas connections typically need to be ¼" tubing, stainless steel and insulated. However the pressure is low so thin wall corrugated tubing can be used and a similar helical coil may be employed. It is also possible to put short, 1 ft, lengths of smaller ⅛ in or 3/16 in dia. tubing without increasing the pressure drop too much. The insulation must not restrict the movement of the tubing needed to accommodate differential thermal expansion during the various reactor operations. Selection of the O-ring material is also important as this provides a safety and contamination barrier for the reactor. The o-rings are usually selected from an elastomeric fluorocarbon material such as Viton or Kalrez because of temperature considerations. The permeability of such material to contaminants such as oxygen, carbon dioxide and water vapor in the atmosphere varies with material composition and temperature. The materials can also slowly deteriorate giving off contaminants. The most critical consideration is control of the o-ring temperature, which should be maintained in the 25–150° C. range and preferably around 50° C. It is of course possible to use multiple O-rings for additional protection at some increased expense but all o-rings must have their temperature maintained in the desired temperature range.

FIG. 5 shows a layout of a preheater for a silicon containing gas. It consists of a gastight vessel, 501, which contains three helical coils, 502, 503 & 504, of tubing each of the same length coiled concentrically in the top half and one or more electrical elements, 505, in the bottom half. The vessel is filled with high temperature heat transfer fluid, 606, so as to cover the heating element/s, 5, during operation, A temperature indicator controller or TIC, 507, is provided to control the temperature of the fluid below the silicon containing gas decomposition temperature, 300–400° C. Each coil has separate inlets, 508, 509, 510 and outlets, 511, 512, 513. The lid, 514, is flanged to the top of the vessel and is removable for access to the coils. A connection, 517, for a pressure gage and pressure relief valve is provided. The penetrations of the coils through the lid are gas tight, typically welded. During operation the silicon containing gas comes in through the separate inlets and leaves without mixing through the outlets. The coils are free to expand and thus exert no force on the connections through the lid which reduces the risk of leaks commonly found at the tube to tubeplate connection of shell and tube heat exchangers. The heat to the coils is supplied by condensing heat transfer fluid vapor, which is produced by boiling the fluid with the electric heating element, 505. Alternatively the liquid may be removed through liquid outlet, 515, and vaporized in an external vaporizer, shown as dotted lines, then returned through the fluid inlet, 516, or the liquid may be removed then heated but not vaporized and returned through, 516. In this latter case it may be necessary to provide baffles and a higher mass flow rate to provide adequate heat transfer. There are many other variants, such as providing more than three coils, using U-shaped tubes or pancake coils which one knowledgeable in the art can design. The coils may be straight tubing, corrugated, twisted or finned.

In an example of operation of this device the gas tight vessel, 501, was 10 inches in diameter and 15 inches tall and fabricated from 304L stainless steel. It was insulated on the top, bottom and sides with a 2" thick layer of Microtherm G pressed silica insulation, 518. The coils, 502, 503 & 504 were each 10 ft long and made from ¼-inch 304L S. S. tubing. The coil diameters were approximately 6 inches, 7 inches and eight inches. The electrical heater was a 4" diameter flange mounted heater of 4 kW with multiple incoloy sheathed elements. The heat transfer fluid was filled to a depth of 8 inches. The fluid used was Dowtherm A. Temperature of operation was controlled at 360 C (680 F) using the temperature indicator controller. Pressure in the vessel was 75 psig. The three coils each heated an average of 67 SLM of silane each from 20 C to 330 C. Actual flow of silane per tube pulsed from 10–100 SLM.

Figure 6A:
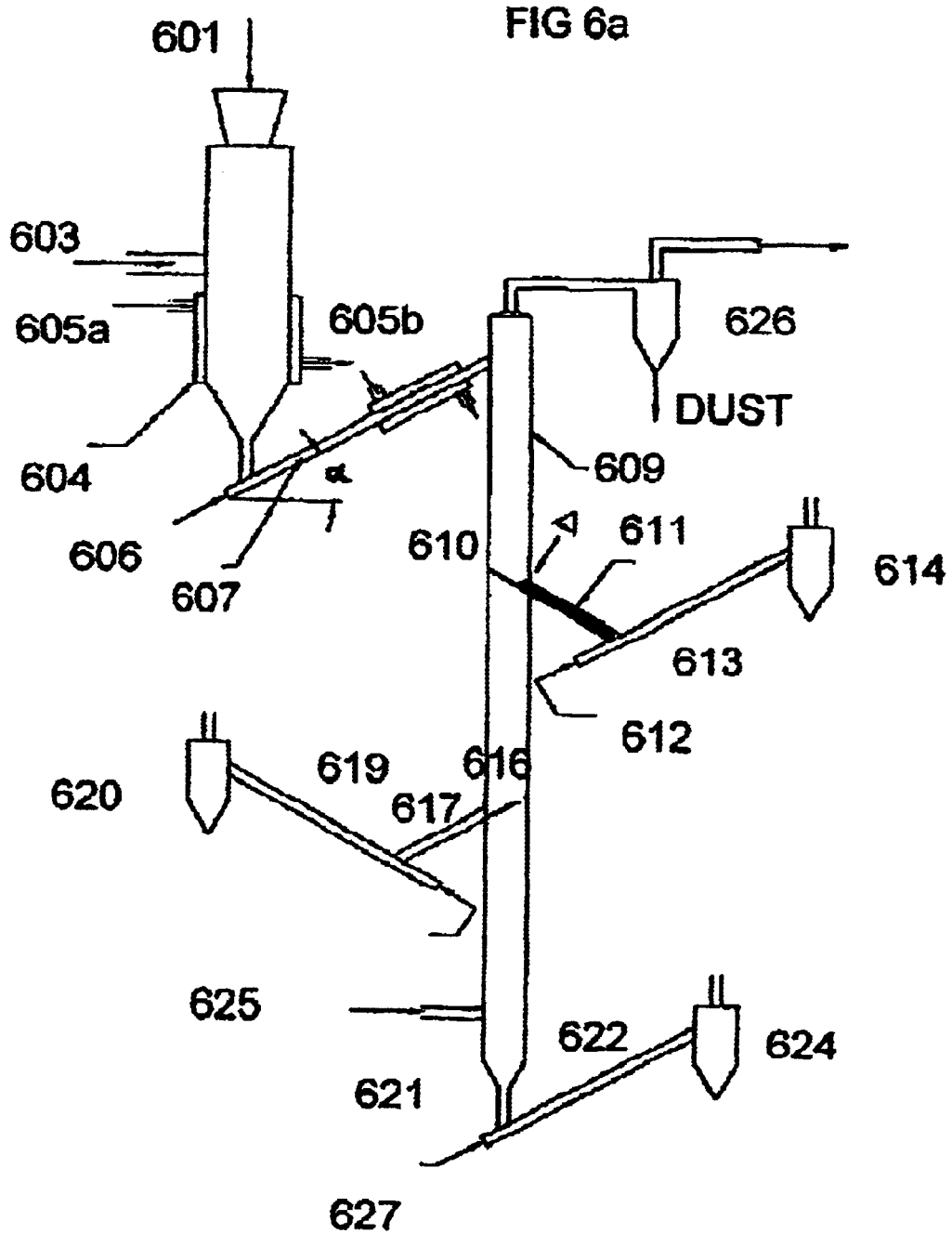
FIG. 6a shows a schematic of the bead removal and sieving system

FIG. 6a shows a schematic representation of the non-contaminating sieving device. The hot beads, stream 601, fall into a cooler, 602, where a gas stream 603 may cool them, which then goes back up into the reactor thus recovering some heat from the beads. In addition the beads may be cooled by a water jacket, 605, with inlet an outlet streams, 605a & 605b. A gas stream 606 is pulsed into tube, 607, which also may be cooled by a water jacket, 608, if desired. The pulsing gas stream pushes a fixed amount of beads out of the cooler, 602, into the siever tube 609. The beads fall onto the first sieve, 610, and the beads smaller than the sieve pass through while the larger beads are retained and exit through stream, 611. These beads may be pulsed using the gas stream 612 through a tube 613 into a container 614. It is advantageous to use a bead detection device, 615, to adjust the bead flow into the container 614 so as to maintain the exit tube, 611, full or nearly full of large beads. This reduces the chance of smaller beads exiting with the large beads and provides a measurement of the flow of large beads since the pulsing flow of the gas stream 612 may be correlated with the bead flow. The sieving process may be repeated as shown with a smaller size sieve, 616, using tubes 617 and 619, gas flow 618 and container 620. The residual undersize beads then fall to the bottom, 621, where they can be removed via tube 623 and gas stream 622 to a container 624. This container can be used to replenish the reactor in a variety of ways apparent to one skilled in the art including pneumatic transport and physically moving the container to a bead feeding port. Such beads may also be reheated. All material with which the beads come into contact must be noncontaminating. Such materials include electronic grade silicon and high purity silicon oxide. The degree of contamination that may be permitted is higher for the product beads than for the return beads since the product is only handled once while the returning beads may be handled multiple times. A further pulsing gas flow, 625, is provided to pulse the beads upwards off the sieves during the sieving process. This prevents blinding of the sieve by oversize material and replaces the vibration normally provided for sieving which is difficult to implement in a non-contaminating system. This gas flow also removes dust particles, which are blown overhead into a dust collector, 626. This dust is undesirable in the product and is likely to contain contaminants from the reactor and from the sieving process.

FIG. 6b shows one possible variation of this concept where two sieves 631, 632, are mounted under each other lengthwise in a cylinder, 633, which is then tilted. The beads are fed in pulses through inlet 630. Large beads leave through exit tube, 634, into container 636, medium beads through exit tube, 636, into container 637, the undersize through exit tube 638 into container 639. FIG. 6c is a cross-section which shows that the sieves can be slanted to the center to aid in the transition to the exit tube. The pulsing gas comes in through inlet, 40, and leaves through exit 41. In design of this variant it is necessary to provide even flow distribution across the sieves which can be done by providing that most of the pressure drop is across the sieves.

An example using FIG. 6a is as follows. The feed and exit tubes were ¼ in i.d., the sieve tube was 1 in i.d. Sieve 610 had 1.2 mm holes on a triangular pattern with 1.5 mm spacing. Sieve 616 has 1 mm holes on a triangular pattern with 1.2 mm spacing. The angle of the sieves to the horizontal was 45 degrees. The angle of the feed and exit tubes were 30 degrees. The holes were drilled at a 45-degree angle to the plate so the holes were vertical after installation. The thickness of the silicon sieves was 1.5 mm. The bead pulse size was 6 gm. The gas pulses of stream 625 were 0.8 sec and 0.8 sec off and two pulses were provided per sieving cycle. The sieve cycle time was 6 seconds for a processing rate of 3.6 kg/hr. 1% was carried overheads as dust, 9% of the beads were oversize, 40% were product size and 50% were undersize. All the tubes were high purity quartz and selected to be low in boron, phosphorus, aluminum, iron and other metals. The sieves were made from high purity undoped silicon wafers which are lower in metals than the high purity quartz and were loser drilled then etched to remove contaminants and surface cracks and to round the edges of the holes.

In summary this new machine provides several new techniques which in combination are able to make low cost, shiny, round and high purity silicon granules, using a low cost reactor with low operating costs which overcomes the previous operating problems of contamination, heating, agglomeration and granule size control, is safe and easy to operate, maximizes silicon yield from feedstock and minimizes external support equipment.

The most important now techniques are; separating the heating of the silicon feedstock gases from the non silicon containing gases and heating the latter to a temperature above the reactor temperature; heating the granules in a heater section and using the pulsing of the gas flow to move the beads into and out of a reactor section; cooling only the localized area around the silicon feedstock entry and minimizing said entries; providing non contaminating sieving and grinding techniques for online removal of large product granules and online or offline grinding of seed granules; a feedstock recovery subsystem which can recycle the byproducts to extinction and providing multiple heater/reactor stages in one vessel.

Separately heating the silicon feedstock gases means that the diluents may be heated to a much higher temperature however it may be beneficial to introduce small amounts of diluents into the silicon feedstock gases at times and it is certainly required to provide a purge flow when the feedstock gases are not flowing. Heating the granules in a heater section and using the pulsing of the gas flow to move the beads into and out of a reactor section allows the beads to be heated to a temperature higher than the reactor temperature with reduced risk of wall deposit formation then returned to the reactor without contamination and can be done using any heating technique and in conjunction with any other reactor heating technique. The pulsing of the beads back and forth also breaks up is agglomerations of beads and prevents channeling inside the reactor so it is possible to provide pulsing for the purposes of agglomeration breakup and use another heating technique although the method of using the pulsing of the beads for both purposes is believed to be the best approach. Cooling only the localized area around the silicon feedstock entry and minimizing said entries provides a method of preventing silicon deposition in and around the immediate vicinity of the nozzle which can ultimately plug the nozzle at a minimum parasitic heat loss from the cooling. Other approaches are also feasible such as using a lower temperature for the silicon containing gases but this imposes a higher heat loss, it is also possible to use more nozzles but this has a similar effect. Providing non-contaminating sieving and grinding techniques for online removal of large product granules and online or offline grinding of seed granules provides a way to obtain high purity product with one or more narrow size distributions and to maintain the granule population in balance by providing seed. The approach shown can be partially implemented with some benefits or in different ways. For example the beads could be kept hotter which would reduce the heat required to reheat the beads returned to the reactor but at the risk of agglomeration and increased handling problems. The beads could be cooled and reheated using heat exchangers to conserve heat at the cost of additional complexity. A feedstock recovery subsystem, for trichlorosilane or tribromosilane, which can recycle the byproducts to extinction, provides a method for improving silicon feedstock utilization and providing a plug-compatible fluid bed reactor system to replace rod reactors without changing the feedstock production facilities. The method shown can be modified to produce more silicon per reactor pass at the expense of greater by product production or vice verse and byproducts such as dichlorosilane and silicon tetrachloride could be removed in a pure form for sale. Providing multiple heater/reactor stages in one vessel gives the opportunity to add additional reactants such as silane or hydrogen and to obtain larger throughputs for a given footprint. It also allows production of very large beads in the bottom section and in the case of silane operation at lower hydrogen to silane ratios, which reduces the risk of contamination. It is possible to have as many stages as is desired and to adjust the diameter of each section independently.

Additional novel features are; heat recovery from granules by direct contact with non silicon containing gases; external flow control of each injection point; heating of the silicon containing gases by a liquid or vapor whose temperature is not high enough to cause decomposition of the gases, measuring reactor weight and pulsing force continuously and using one or more high efficiency cyclones to removes small diameter dust.

What is claimed is:

1. A machine for Production of Granular Silicon comprising:
  a heating section located below a reacting section; where said heating section comprises one or more tubes heated by one or more heaters
  a mechanism that pulses silicon granules back and forth between the heating and reacting sections wherein the mechanism includes at least one separate injection means for injection non silicon containing gases into the heating section;
  separate injection means for injecting silicon containing gases into the reaction section;
  a heating means to heat the non silicon containing gases above a reaction temperature.

2. A machine of claim 1 further including at least one additional stage connected above the reacting section and containing a second reacting section, a heating means, and one or more gas injecting means.

3. A machine of claim 2, where high purity hydrogen is used for the non silicon containing gas to the first stage and silane is injected via the separate injection means for silicon containing gas in all the stages.

4. A machine of claim 2, where; high purity hydrogen is injected in the first and subsequent stages, a silicon containing gas selected from a first group consisting of trichlorosilane, dichlorosilane, tribromosilane, dibromosilane, triodosilane, diiodosilane and mixtures thereof is injected via the separate injection means for silicon containing gas in the first stage and further comprising a final feedstock recovery system where a silicon tetrahalide selected from a second group consisting of silicon tetrachloride, silicon tetrabromide and silicon tretraiodine is injected, mixed with the reactor effluent then quenched at an optimal temperature to recover gases from the first group, residual silicon tetrahalides from the prior second group and hydrogen.

5. A machine of claim 2 where at least one of the at least one additional stage contains some residual silicon dust and/or silicon containing gases.

6. A machine of claim 1 further comprising a means for recovering heat from the granules by direct contact with a high purity gas, which has carbon and oxygen containing contaminants below 1 ppmv, parts per million by volume, and which can be selected either from a first group consisting of hydrogen, helium, argon, nitrogen and mixtures thereof, or from a second group consisting of helium, argon, nitrogen, silicon tetrachloride, silicon tetrabromide and mixtures thereof.

7. A machine of claim 1 further comprising a heat exchanger in which one or more containment means for the silicon containing gases are heated by hot liquid or condensing vapor maintained within a temperature range which cannot cause decomposition of the gases; which temperature range is about 200–400° C.

8. A machine of claim 7 where the location of the one or more flow control means for the silicon containing gas is upstream of the heat exchanger.

9. A machine of claim 1 further comprising a sieving device, operated either continuously or in batches, by which the silicon granules are sieved using one or more sieves manufactured from non contaminating sieve material selected from the group consisting of single crystal silicon, polycrystalline silicon, silicon oxide, silicon nitride, silicon oxynitride, silicon carbide and mixtures thereof where the contaminants in the abradable surfaces is less than about 1000 ppmwt.

10. A machine of claim 1 further comprising a feedstock recovery section; where hydrogen is injected in the heating section, a silicon containing gas selected from a first group, consisting of trichlorosilane dichlorosilane, tribromosilane, dibromosilane, triodosilane, diiodosilane and mixtures thereof is injected via the separate injection means for silicon containing gas in the reacting section and a silicon tetrahalide selected from a second group, consisting of silicon tetrachloride, silicon tetrabromide and silicon tetraiodide is injected after the reactor section, mixed with the reactor effluent then quenched at an optimal temperature to recover hydrohalosilanes selected from the first group, residual silicon tetrahalides selected from the second group and hydrogen.

11. A machine of claim 10 where a cyclone is used after the injection of the silicon tetrahalide to remove silicon dust and to provide residence time for the mixing and reaction of the silicon tetrahalide with the reactor effluent and the silicon dust to improve the recovery of the said silicon hydrohalosilanes and tetrahalides.

12. A machine of claim 1 further comprising one or more cooled joints between external equipment and the reactor which transmit hot gases or solids and which are cooled using, one or more, microchannels positioned to primarily cool the immediate area around the connection to the reactor and/or the seal area of the connection to the external equipment.

13. A machine of claim 1 further comprising an external flow control means for controlling flow to each of said injection means, selected from a group consisting of: a means for direct flow control of each said injection means a means of indirect flow control by a flow distribution device or a combination of the two where some of the said injection means are ganged in groups.

14. A machine of claim 1 where the instantaneous flow of gases into the reactor through one or more of the injection means is varied periodically and/or the distribution of flow between said injection means is adjusted to control the generation of new particles without changing the total flow averaged over 1 minute.

15. A machine of claim 1 where the heating section is of smaller diameter than the reacting section above it and connected by a tapered section, angle of said tapered section to be between 10 and 80 degrees from the vertical.

16. A machine of claim 1 where the heaters used in the heating sections are selected from the group consisting of resistance heaters, inductive RF heaters, microwave heaters, lamp heaters or lasers.

17. A machine of claim 1 further including a means of supplying a silicon etching gas which is injected through one or more of the injection means for the purpose of etching wall deposits from all or part of the reactor, where the gas is selected from the group consisting of chloride, bromine, iodine, hydrogen chloride, hydrogen bromide, hydrogen iodide, a mixture of hydrogen and silicon tetrachloride, a mixture of hydrogen and silicon tetrabromide, a mixture of hydrogen and silicon tetraiodide and mixtures thereof.

18. A machine of claim 1 where the reactor is supported upon a weigh cell, capable of both weighing the reactor and its contents and of measuring the intermittent force exerted by the pulsing granules and where the connections to and from the reactor are flexible enough to allow the movement required by the weigh cell and the thermal expansion of the reactor relative to the support structure, said movement to be less than 1" (25 mm).

19. A machine of claim 1 where all or a portion of the non silicon containing gases are heated to a temperature below the reaction temperature outside the heating section then heated to a temperature above the reaction temperature inside the heating section prior to entry to the reacting section.

* * * * *